US011939520B2

(12) United States Patent
Alkhalaf et al.

(10) Patent No.: US 11,939,520 B2
(45) Date of Patent: Mar. 26, 2024

(54) METHODS AND CEMENT COMPOSITIONS FOR REDUCING CORROSION OF WELLBORE CASINGS

(71) Applicant: Saudi Arabian Oil Company, Dhahran (SA)

(72) Inventors: Sara A. Alkhalaf, Alkhobar (SA);
Abdullah S. Al-Yami, Dhahran (SA);
Vikrant Wagle, Abqaiq (SA);
Mohammed Murif Al-Rubaii, Dammam (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 58 days.

(21) Appl. No.: 16/991,299

(22) Filed: Aug. 12, 2020

(65) Prior Publication Data
US 2022/0049150 A1 Feb. 17, 2022

(51) Int. Cl.
*C09K 8/54* (2006.01)
*C09K 8/42* (2006.01)

(52) U.S. Cl.
CPC . *C09K 8/54* (2013.01); *C09K 8/42* (2013.01)

(58) Field of Classification Search
CPC ........ C09K 8/54; C09K 8/42; C09K 2208/32; C09K 8/473; C09K 8/467; C04B 2103/0035; C04B 2103/61; C04B 24/121; C04B 28/02
See application file for complete search history.

(56) References Cited

U.S. PATENT DOCUMENTS

| | | |
|---|---|---|
| 2,437,842 A | 3/1948 | Uhler |
| 2,761,843 A | 9/1956 | Brown |
| 4,012,264 A | 3/1977 | Murray et al. |
| 4,257,814 A | 3/1981 | Kellet et al. |
| 4,373,956 A | 2/1983 | Rosskopf |
| 4,481,037 A | 11/1984 | Beale et al. |
| 4,482,383 A | 11/1984 | Mckenzie |
| 4,493,771 A | 1/1985 | Wilson et al. |
| 4,515,708 A | 5/1985 | Haslegrave et al. |
| 4,976,316 A | 12/1990 | Carpenter et al. |
| 5,057,467 A | 10/1991 | Croft |
| 5,450,900 A | 9/1995 | Schalla et al. |
| 5,641,385 A | 6/1997 | Croft et al. |
| 6,153,049 A | 11/2000 | Croft |
| 6,312,560 B1 | 11/2001 | Croft |
| 6,723,163 B1 | 4/2004 | Hofmann |
| 7,617,870 B1 | 11/2009 | Roddy et al. |
| 7,863,228 B2 | 1/2011 | Loper et al. |
| 9,434,911 B2 | 9/2016 | Bennett et al. |
| 9,617,185 B2 | 4/2017 | Ferrari et al. |
| 9,617,461 B2 * | 4/2017 | Nelson .................. C04B 14/104 |
| 9,850,419 B2 | 12/2017 | Ballew et al. |
| 10,144,860 B1 | 12/2018 | Reddy |
| 2003/0152479 A1* | 8/2003 | Heuer ....................... C01D 1/42 422/16 |
| 2004/0171499 A1* | 9/2004 | Ravi ...................... C09K 8/473 507/200 |
| 2008/0289826 A1 | 11/2008 | Burts, Jr. et al. |
| 2009/0194283 A1 | 8/2009 | Ermel et al. |
| 2009/0200029 A1 | 8/2009 | Roddy et al. |
| 2011/0028594 A1* | 2/2011 | Roddy ................... C09K 8/035 525/50 |
| 2013/0231416 A1* | 9/2013 | Chatterji ................. C04B 28/08 523/130 |
| 2014/0190696 A1 | 7/2014 | Iverson et al. |
| 2015/0197033 A1 | 7/2015 | Agapiou et al. |
| 2016/0208158 A1 | 7/2016 | Monahan et al. |
| 2016/0264465 A1 | 9/2016 | Wibowo et al. |
| 2017/0210967 A1 | 7/2017 | Nelson et al. |
| 2019/0106952 A1 | 4/2019 | Shine, Jr. |
| 2019/0225542 A1 | 7/2019 | Patil et al. |
| 2021/0253938 A1* | 8/2021 | Meng .................... C23F 11/149 |

FOREIGN PATENT DOCUMENTS

| | | |
|---|---|---|
| CA | 794413 A | 9/1968 |
| CN | 106554765 A | 4/2017 |
| CN | 105541158 B | 11/2017 |
| EP | 3868730 A1 | 8/2021 |
| WO | 2009103944 A1 | 8/2009 |
| WO | 2017034547 A1 | 3/2017 |

(Continued)

OTHER PUBLICATIONS

U.S. Office Action dated Feb. 10, 2022 pertaining to U.S. Appl. No. 16/995,069, filed Aug. 17, 2020, 35 pages.
U.S. Office Action dated Feb. 22, 2022 pertaining to U.S. Appl. No. 16/920,965, filed Jul. 6, 2020, 33 pages.
International Search Report and Written Opinion dated Mar. 25, 2021 pertaining to International application No. PCT/US2020/063992 filed Dec. 9, 2020, 17 pgs.
Rihan et al., "The Effect of Two Amine-Based Corrosion Inhibitors in Improving the Corrosion Resistance of Carbon Steel in Sea Water" ASM International, JMEPEG vol. 23, pp. 693-699, 2014.
Houska, "Deicing Salt—Recognizing the Corrosion Threat," International Molybdenum Association (2009), available at: https://www.imoa.info/download_files/stainless-steel/DeicingSalt.pdf (last accessed Nov. 10, 2020).

(Continued)

*Primary Examiner* — Kumar R Bhushan
(74) *Attorney, Agent, or Firm* — Dinsmore & Shohl LLP

(57) ABSTRACT

A corrosion inhibiting cement composition for reducing corrosion of wellbore casings is disclosed that includes from 10 weight percent to 70 weight percent cement precursor, from 5 weight percent to 70 weight percent water, from 0.1% to 60% by weight of cement amine corrosion inhibitor, where the amine corrosion inhibitor comprises a polyethylene polyamine. A method for reducing corrosion of wellbore casings includes dispensing the corrosion inhibiting cement compositions into the annulus and allowing the corrosion inhibiting cement composition to cure to form a hardened cement, where the corrosion inhibiting cement composition includes a cement composition and the amine corrosion inhibitor.

8 Claims, 6 Drawing Sheets

(56) References Cited

FOREIGN PATENT DOCUMENTS

WO 2018144684 A1 8/2018
WO 2019074830 A1 4/2019

OTHER PUBLICATIONS

International Search Report and Written Opinion dated Jul. 1, 2021 pertaining to International application No. PCT/US2021/024401 filed Mar. 26, 2021, 17 pages.
International Search Report and Written Opinion dated May 12, 2021 pertaining to International application No. PCT/US2020/066340 filed Dec. 21, 2020, 16 pgs.
U.S. Office Action dated Mar. 8, 2023 pertaining to U.S. Appl. No. 17/954,773, filed Sep. 28, 2022, pp. 1-18.

\* cited by examiner

US 11,939,520 B2

METHODS AND CEMENT COMPOSITIONS FOR REDUCING CORROSION OF WELLBORE CASINGS

TECHNICAL FIELD

Embodiments of the present disclosure generally relate to natural resource well drilling and, more specifically, to methods and cement compositions for wellbore cementing.

BACKGROUND

Extracting subterranean hydrocarbon sources may require drilling a hole from the surface to the subterranean geological formation housing the hydrocarbons. Specialized drilling techniques and materials are utilized to form the wellbore hole and extract the hydrocarbons. Specialized materials utilized in drilling operations include materials for sealing the casing-casing annulus between two tubular strings installed in the wellbore. Such specialized materials may also be formulated for specific downhole conditions.

A wellbore is a hole that extends from the surface to a location beneath the surface to permit access to hydrocarbon-bearing subterranean formations. The wellbore contains at least a portion of a fluid conduit that links the interior of the wellbore to the surface. The fluid conduit coupling the interior of the wellbore to the surface may be capable of permitting regulated fluid flow from the interior of the wellbore to the surface. The fluid conduit may also permit access between equipment on the surface and the interior of the wellbore. The fluid conduit may be defined by one or more tubular strings, such as wellbore casings for example, inserted into the wellbore and secured in the wellbore.

SUMMARY

The tubular strings forming the fluid conduit may have at least two openings (typically on opposing ends) with an enclosing wall having an interior surface and an exterior surface. The interior surface defines the fluid conduit. Examples of tubular strings and portions of tubular strings used in the wellbore as fluid conduits or for making or extending fluid conduits include casings, production liners, coiled tubing, pipe segments, tubes, pipe strings, mechanical structures with interior voids, or combinations of these. A tubular string may include an assembly of several shorter tubular strings connected to one another, such as joined pipe segments or casings.

When positioned in the wellbore, the exterior surfaces of the tubular string and the internal wall of the wellbore define a wellbore annulus. The wellbore annulus has a volume in between the external surface of the tubular string and the wellbore wall. Additional casing-casing annuli may be formed by installing progressively smaller tubular strings within the larger tubular string initially secured in the wellbore. Installing each tubular string includes positioning the tubular string in the wellbore and placing a sealing material, such as a cement, in the wellbore annulus or the casing-casing annulus to seal the annulus.

Primary sealing refers to the process of initially sealing the annulus upon installation of the tubular string in the wellbore. Primary sealing may refer to initial sealing of the annulus between the exterior surface of the tubular string and the wellbore wall of the wellbore or initial sealing of a casing-casing annulus. Primary sealing in conventional wellbore installations may be performed with wellbore cement and, thus, may be commonly referred to as "primary cementing." Primary sealing or cementing forms a protective solid sheath around the exterior surface of the tubular string.

One objective of primary cementing is to protect the tubular strings against corrosive fluids, such as hydrocarbon fluids or injection fluids containing hydrogen sulfide or salts, such as sodium chloride. These corrosive components in hydrocarbon fluids or injection fluids can cause corrosion of tubular strings inserted into the wellbore. Primary cementing can provide some protection to the exterior surface of the tubular strings. However, despite the protection provided by primary cementing, corrosion of tubular strings remains a problem in hydrocarbon production wells and injection wells. The economic costs of corrosion are extremely high, with large amounts of capital spent on corrosion prevention and replacement of corroded materials, such as corroded tubular strings.

Accordingly, ongoing needs exist for methods and corrosion inhibiting cement compositions for reducing or preventing corrosion of metal tubular strings installed in wellbores. The present disclosure is directed to methods for reducing corrosion of tubular strings installed in wellbores, which corrosion can be caused by exposure of the metal tubular strings to corrosive constituents of hydrocarbon fluids extracted from subterranean formations, drilling fluids employed for drilling the wellbore, and treatment fluids injected into subterranean formations. The methods of the present disclosure may reduce corrosion of metal tubular strings by combining a polyethylene polyamine and a cement composition to form a corrosion inhibiting cement composition, and applying the corrosion inhibiting cement composition to the annulus during primary cementing of the tubular string. The polyethylene polyamines may react with the metal at the surface of the tubular string to form a protective layer on the surface of the tubular string. The protective layer formed by reaction of the polyethylene polyamine with the metal surface of the tubular string may reduce or prevent dissolution of iron or other metals from the surface of the tubular string to reduce corrosion.

According to one or more aspects of the present disclosure, methods for reducing corrosion in tubular strings installed in wellbores may include dispensing a corrosion inhibiting cement composition into an annulus defined between a tubular string and an inner wall of a wellbore or between two tubular strings. The corrosion inhibiting cement composition may comprise a polyethylene polyamine and a cement composition comprising a cement precursor and water. The methods may further include allowing the corrosion inhibiting cement composition to cure in the annulus to form a cured cement. The polyethylene polyamines in the corrosion inhibiting cement composition may react with a metal of the tubular string, the reaction forming a protective layer on the surfaces of the tubular string, where the protective layer may reduce or prevent dissolution of iron from the metal of the tubular string.

According to one or more other aspects of the present disclosure, a corrosion inhibiting cement composition for reducing corrosion of wellbore casings may include from 10 weight percent to 70 weight percent cement precursor based on the total weight of the cement composition, from 5 weight percent to 70 weight percent water based on the total weight of the cement composition, and from 0.1 percent BWOC to 60 percent BWOC polyethylene polyamine, where the polyethylene polyamine comprises at least one of TEPA, PEHA, HEHA, one or more polyethylene polyamines having molecular weights greater than a molecular weight of HEHA, or combinations of these.

Additional features and advantages of the described embodiments will be set forth in the detailed description which follows, and in part will be readily apparent to those skilled in the art from that description or recognized by practicing the described embodiments, including the detailed description which follows as well as the drawings and the claims.

BRIEF DESCRIPTION OF THE DRAWINGS

The following detailed description of specific aspects of the present disclosure can be best understood when read in conjunction with the following drawings, in which like structure is indicated with like reference numerals and in which.

Figure 1:
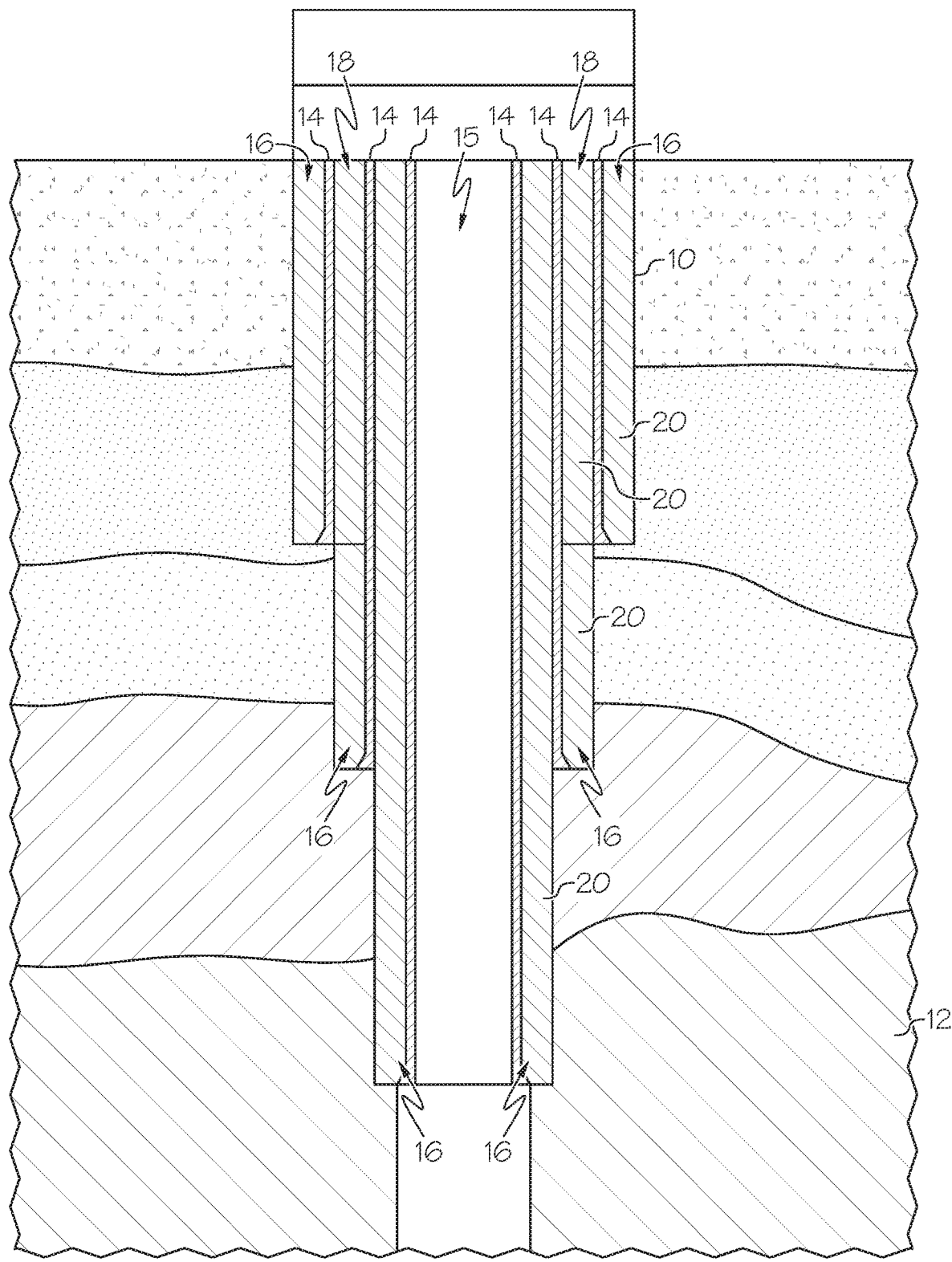
FIG. 1 schematically depicts a plurality of tubular strings installed in a wellbore, according to one or more embodiments shown and described in the present disclosure.

Reference will now be made in greater detail to various aspects of the present disclosure, some aspects of which are illustrated in the accompanying drawings.

DETAILED DESCRIPTION

The present disclosure is directed to methods and corrosion inhibiting cement compositions for reducing corrosion of tubular strings installed in wellbores for hydrocarbon production. A method for reducing corrosion in tubular strings installed in wellbores according to the present disclosure includes dispensing a corrosion inhibiting cement composition into an annulus defined between the tubular string and an inner wall of the wellbore, where the corrosion inhibiting cement composition may include an amine corrosion inhibitor, such as a polyethylene polyamine, and a cement composition comprising a cement precursor and water. The method may further include allowing the corrosion inhibiting cement composition to cure in the annulus to form a cured cement. The amine corrosion inhibitor, such as polyethylene polyamines, present in the corrosion inhibiting cement composition may react with a metal of the tubular string to form a protective layer on the surfaces of the tubular string. The protective layer formed by reaction between the amine corrosion inhibitor and the metal of the tubular string may inhibit, reduce, or prevent dissolution of iron from the metal of the tubular string.

As used throughout this disclosure, the term "hydrocarbon-bearing formation" may refer to a subterranean geologic region containing hydrocarbons, such as crude oil, hydrocarbon gases, or both, which may be extracted from the subterranean geologic region. The terms "subterranean formation" or just "formation" may refer to a subterranean geologic region that contains hydrocarbons or a subterranean geologic region proximate to a hydrocarbon-bearing formation, such as a subterranean geologic region to be treated for purposes of enhanced oil recovery or reduction of water production.

As used throughout this disclosure, the term "fluid" may include liquids, gases, or both.

As used throughout the present disclosure, the term "spacer fluid" may refer to a fluid utilized to maintain separation between any two other materials utilized in well production, such as fluids that may be incompatible with each other, for example.

As used throughout the present disclosure, the term "displacement fluid" may refer to a fluid injected into the wellbore to displace a different fluid out of the wellbore and into the annulus or into a portion of the subterranean formation.

As used throughout the present disclosure, the term "cement precursor" may refer to any suitable material which, when mixed with water, may be cured into a cement. A cement precursor may be hydraulic or non-hydraulic.

As used throughout this disclosure, the term "cure" or "curing" may refer to providing adequate moisture, temperature and time to allow a cement or concrete to achieve the desired properties (such as hardness) for its intended use through one or more reactions between the water and the cement precursor.

As used throughout the present disclosure, the term "annulus" may refer to the volume defined between the exterior surface of a tubular string and the wellbore wall or an inner surface of another tubular string that surrounds to the tubular string. The term "annulus" may refer to the wellbore annulus, a casing-casing annulus, or both.

As used throughout the present disclosure, the term "by weight of cement" may refer to an amount of a constituent of the corrosion inhibiting cement composition relative to the amount of the cement precursor in the corrosion inhibiting cement composition and can be calculated by dividing the weight of the constituent by the total weight of the cement precursor in the corrosion inhibiting cement composition. "By weight of cement" may be abbreviated using the acronym BWOC.

As used throughout the present disclosure, the term "substantially free" of a constituent in the cement composition means that the cement composition includes less than 1% BWOC of that constituent. When used outside the context of the cement composition, the term "substantially free" of a constituent refers to less than 1 weight percent (wt.%) of that component in a composition. For example, an amine corrosion inhibitor that is substantially free of monoethanolamine may have less than 0.1 wt.% monoethanolamine based on the total weight of the amine corrosion inhibitor.

Referring to FIG. 1, a wellbore 10 having a plurality of tubular strings 20 installed in the wellbore 10 is schematically depicted. The wellbore 10 forms a pathway capable of permitting both fluid and apparatus to traverse between the surface 14 and the hydrocarbon-bearing formation 16 or other subterranean formation. Besides defining the void volume of the wellbore 10, the wellbore wall 18 may also act as an interface through which fluid can transition between the subterranean formations through which the wellbore 10 traverses and the interior of the wellbore 10. The wellbore wall 18 can be unlined (that is, bare rock or formation) to permit such interaction with the formation or lined (that is, with one or more tubular strings 20 as previously described in this disclosure) so as to not permit such interactions.

The wellbore 10 may contain at least a portion of a fluid conduit 12 linking the interior of the wellbore 10 to the surface 14. The fluid conduit 12 connecting the interior of the wellbore 10 to the surface 14 may be capable of permitting regulated fluid flow from the interior of the wellbore 10 to the surface 14 and may permit access between equipment on the surface 14 and the interior of the wellbore 10. As previously described, the fluid conduit 12 may be defined by one or a plurality of tubular strings 20 installed in the wellbore 10, which may form a wellbore annulus 22 with the wellbore wall 18 of the wellbore 10. The wellbore annulus 22 comprises an annular volume defined between an external surface 24 of the tubular string 20 and the wellbore wall 18. As wellbore drilling continues and the wellbore 10 extends deeper into the subterranean formation, one or more additional tubular strings 20 may be installed within the fluid conduit 12 defined by the initial tubular string 20. Additional tubular strings 20 may have outer cross-sectional dimensions that are less than the inner cross-sectional dimensions of the tubular strings 20 within which the additional tubular strings are disposed. Each additional tubular string 20, when installed in the wellbore 10, may form a casing-casing annulus 32 defined between the exterior surface 24 of the additional tubular string 20 and the interior surface 26 of the tubular string 20 surrounding the additional tubular string 20. After drilling is complete and the wellbore 10 is fitted with production tubing for production, the wellbore 10 may include a plurality of tubular strings 20 of progressively smaller cross-sectional dimensions that define the wellbore annulus 22 and a plurality of casing-casing annuli 32 (annular region defined between two tubular strings).

As previously described in this disclosure, installing each tubular string 20 may include positioning the tubular string 20 in the wellbore 10 and primary cementing of the tubular string 20 in the wellbore 10. The primary cementing process may include placing a cement composition in the wellbore annulus 22, casing-casing annulus 32, or both, and curing the cement composition to seal the wellbore annulus 22, casing-casing annulus 32, or both. Primary cementing may anchor and support the tubular string 20 in the wellbore 10. Primary sealing may also provide a hydraulic seal in the annulus (wellbore annulus 22, casing-casing annulus 32, or both) that may prevent migration of gases and liquids from one side of the hydraulic seal to the other. This hydraulic seal may prevent fluid communication between production zones in the wellbore 10, referred to as zonal isolation, or may prevent migration of fluids to the surface 14.

Before primary sealing can be performed, the wellbore 10 may be drilled using a drill string (not shown) in the presence of a drilling fluid, which may be retained in the wellbore 10 at the conclusion of drilling. With the drilling fluid left in the wellbore 10, the tubular string 20 may be positioned in the wellbore 10. When the tubular string 20 is positioned in the wellbore 10, the drilling fluid may occupy the interior volume of the tubular string 20 as well as the wellbore annulus 22 between the exterior surface 24 of the tubular string 20 and the wellbore wall 18. For interior tubular strings, the tubular string 20 may form a wellbore annulus 22 between the exterior surface 24 and the wellbore wall 18 along part of the length of the tubular string 20 and a casing-casing annulus 32 between the exterior surface 24 and an interior surface 26 of the previously installed tubular string 20 along an uphole part of the length of the tubular string 20. A displacement fluid may be pumped down the fluid conduit 12 after the cement to displace the cement composition from the fluid conduit 12 up into the wellbore annulus 22, casing-casing annulus 32, or both.

As previously discussed, primary cementing may provide some protection against corrosion caused by contact with corrosive fluids recovered from the subterranean formation or injected from the surface into the subterranean formation. However, corrosion of tubular strings remains a significant problem in hydrocarbon production wells and injection wells. Corrosion is a natural process that involves the weakening and degradation of metal components, such as tubular strings made from metals, such as iron and steel. Corrosion is an electrochemical reaction that has several types, such as chemical corrosion, electro-chemical corrosion, and atmospheric corrosion. This corrosion of tubular strings may be caused by various constituents of the hydrocarbons produced from the subterranean formation or various constituents of treatments fluids injected through injection wells. Some hydrocarbon bearing formations may produce gas or liquid hydrocarbon streams containing concentrations of hydrogen sulfide ($H_2S$) and other sulfur containing compounds sufficient to cause corrosion of the tubular strings.

Additionally, liquid hydrocarbon streams produced from the formation or treatment fluids, such as brine, injected into the formation may also include metal salts that can contribute to corrosion of the tubular strings. When metals, such as iron, steel, or both, come into contact with oxidizing substances, such as but not limited to water and salty water, rust may begin to form. One of the most significant corrosive components are chloride salts such as, sodium chloride (NaCl), calcium chloride ($CaCl_2$), and magnesium chloride ($MgCl_2$). Salts impact corrosion rates in several ways. Salts have ability to absorb water from the air (hygroscopic), which can make the salts electrically conductive such that they can conduct an electric current. This ability to conduct an electric current can accelerate the corrosion process of metal tubular strings. In addition, the chloride ions in salts can break down protective oxide layers formed on the metal, which can further accelerate corrosion of the metal tubular strings. Other constituents of hydrocarbon streams produced from hydrocarbon bearing formations or treatment fluids injected into the wellbore or subterranean formation may also contribute to corrosion of the metal tubular strings and other metal components installed in the wellbore.

As previously discussed, embodiments of the present disclosure are directed to methods for cementing a tubular string in a wellbore while reducing corrosion of the tubular strings by dispensing a corrosion inhibiting cement composition into the annulus and allowing the corrosion inhibiting cement composition to cure in the annulus (wellbore annulus 22, casing-casing annulus 32, or both) to form a cured cement. The corrosion inhibiting cement composition may include a cement composition and at least one amine corrosion inhibitor, such as one or more polyethylene polyamines. The amine corrosion inhibitor may react with metal at the surface of the tubular strings to form a protective layer at the surface of the tubular strings. This protective layer formed through reaction of the amine corrosion inhibitor with the metal may prevent iron or other metals from dissolving from the surface of the metal of the tubular strings. Thus, the amine corrosion inhibitor, such as polyethylene polyamines, in the corrosion inhibiting cement composition may provide a corrosion inhibiting effect to reduce or prevent corrosion of the metal tubular strings installed in wellbores.

Referring again to FIG. 1, the method for reducing corrosion of tubular strings 20 installed in wellbores 10, may include dispensing the corrosion inhibiting cement composition into the wellbore annulus 22 defined between the tubular string 20 and the wellbore wall 18 of the wellbore 10, between two tubular strings 20 positioned in the wellbore 10, or both. The corrosion inhibiting cement composition may include at least one polyethylene polyamine, or other amine corrosion inhibitor, and a cement composition comprising a cement precursor and water. The cement composition and the at least one polyethylene polyamine (or other amine corrosion inhibitor) may have any of the features, compositions, or characteristics subsequently described for these constituents of the corrosion inhibiting cement composition. The method may further include allowing the corrosion inhibiting cement composition to cure in the annulus (wellbore annulus 22, casing-casing annulus 32, or both) to form a cured cement, where the polyethylene polyamines, or other amine corrosion inhibitors, in the corrosion inhibiting cement composition may react with a metal of the tubular string 20, the reaction forming a protective layer on the surfaces of the tubular string 20. The protective layer may inhibit dissolution of iron or other metal ions from the metal of the tubular string 20. The method may further include preparing the cement composition and combining the at least one polyethylene polyamine, or other amine corrosion inhibitor, to the cement composition to produce the corrosion inhibiting cement composition. The method may further include mixing the corrosion inhibiting cement composition to obtain a homogeneous mixture.

Prior to preparing the corrosion inhibiting cement composition and dispensing the corrosion inhibiting cement composition into the annulus 22, 32, the method may include drilling the wellbore 10, placing the tubular string 20 in the wellbore 10, or both. Dispensing the corrosion inhibiting cement composition into the annulus 22, 32 may include dispensing (such as by pumping) the corrosion inhibiting cement composition into the fluid conduit 12 defined by an interior surface 26 of the tubular string 20 and dispensing a displacement fluid into the fluid conduit 18 after the corrosion inhibiting cement composition such that the displacement fluid displaces the corrosion inhibiting cement composition from the fluid conduit 18 into the annulus, such as the wellbore annulus 22, casing-casing annulus 32, or both. The displacement fluid may be pumped into the fluid conduit 12 of the tubular string 20 after an uphole plug to force the corrosion inhibiting cement composition to the downhole end of the tubular string 20, around the downhole edge of the tubular string 20, and into the annulus 22, 32. A displacement fluid may also be referred to as a flush fluid. The displacement fluid may be pumped into the fluid conduit 12 of the tubular string 20 until all of the corrosion inhibiting cement composition is disposed within the annulus 22, 32. Cooperation of a downhole plug and the uphole plug may operate to maintain the corrosion inhibiting cement composition in the annulus 22, 32.

In embodiments, the corrosion inhibiting cement compositions may include one or more constituents that may be at least partially incompatible with drilling fluids or other treatment fluids present in the wellbore 10 prior when installing the tubular strings 20. When the corrosion inhibiting cement composition includes constituents incompatible with drilling or treatment fluids already present in the wellbore 10, the method may further include dispensing a spacer fluid into the fluid conduit 18, the wellbore 10, or both, before dispensing the corrosion inhibiting cement composition into the wellbore 10. The spacer fluid may provide a buffer between the drilling fluid or treatment fluid and the corrosion inhibiting cement composition to prevent contact between incompatible constituents. Various washing fluids or pre-flush fluids may also be introduced to the interior volume of the tubular string 20 before or after the spacer fluid. Washing fluids may be used to remove films and residue from the surfaces of the tubular string 20 and wellbore wall. A fixed amount of the corrosion inhibiting cement composition may then be pumped into the internal volume of the tubular string 20 after the spacer fluid. The fixed amount of the corrosion inhibiting cement composition may be an amount that fills the annulus, such as the wellbore annulus, casing-casing annulus, or both. A downhole plug may be used between the spacer fluid and corrosion inhibiting cement composition, and an uphole plug may be inserted after the corrosion inhibiting cement composition.

The corrosion inhibiting cement compositions may be used for sealing the annulus or remediating a wellbore under a range of different downhole conditions in the wellbore. The corrosion inhibiting cement compositions may be adapted to different downhole conditions by changing the concentrations of amine corrosion inhibitor, cement retarders, weighting materials, or additives in the corrosion inhibiting cement composition to modify the specific gravity, viscosity, mechanical properties, curing time, or other properties of the cement composition.

The corrosion inhibiting cement composition may then be allowed to cure to form a barrier between the tubular string 20 and the wellbore 10, between the tubular string 20 and an outer tubular string 20, or both. When the corrosion inhibiting cement composition cures, the corrosion inhibiting cement composition may physically and chemically bond with both the exterior surface of the tubular string and the wellbore wall or interior surface of the outer casing surrounding the tubular string, coupling the tubular string to the wellbore wall or the outer casing. This fluid isolation does not permit fluid migration through the cement composition to the interior of the well or up-hole to the surface.

In addition to primary sealing, remedial sealing may be performed using the corrosion inhibiting cement compositions. In remedial sealing, the corrosion inhibiting cement composition may be introduced to specific locations within the wellbore 10 to repair the wellbore 10, such as to repair sections of the wellbore in which micro-cracks have formed in the annuli or in which increased casing-casing annulus pressure has caused damage to the tubular strings 20. Remedial sealing may also include injecting the corrosion inhibiting cement composition into the wellbore 10 for purposes of sealing the wellbore 10 in preparation for abandonment. In some situations, remedial sealing may include the process of "squeezing," in which the corrosion inhibiting cement composition is forced against the inner surface of the portion of the well to be remediated, such as the inner surface of the innermost tubular string. As the corrosion inhibiting cement composition is forced against the inner surface of the tubular string or wellbore wall, liquid portions of the corrosion inhibiting cement composition may be "squeezed" into the microcracks, or into the formation in the case of remediating the wellbore wall.

The corrosion inhibiting cement composition will now be described in further detail. As previously discussed, the corrosion inhibiting cement composition may include a cement composition and at least one amine corrosion inhibitor. The at least one amine corrosion inhibitor may be an organic compound that includes one or a plurality of amine groups. The amines groups of the amine corrosion inhibitor may inhibit corrosion of metals by adsorption of the amine group(s) to the metal surface to form a protective aggregate layer bonded to the surface of the metal. The protective aggregate layer formed on the surface of the metal may inhibit the dissolution of iron or other metal ions from the metal. The protective aggregate layer may reduce the rate of or prevent dissolution of iron and other metal ions from the metal of the tubular strings 20.

The amine corrosion inhibitor may include one or a combination of monoethanolamine (MEA), triethanolamine (TEA), or polyethylene polyamines. Polyethylene polyamines may include a compound or mixture of compounds having the following chemical formula (I):

$$H_2NCH_2CH_2(NHCH_2CH_2)_xNH_2 \quad (I)$$

where x is an integer greater than or equal to 3, such as 3, 4, 5, 6, or greater than 6. The polyethylene polyamines may be linear, cyclic, branched, or combinations of these. The polyethylene polyamines of the amine corrosion inhibitor may have greater than or equal to 5 amine groups, such as greater than or equal to 6 amine groups, or even greater than or equal to 7 amine groups. The number of amine groups in the polyethylene polyamine may depend on the molecular weight of the polyethylene polyamine, with the total number of amine groups increasing with increasing molecular weight. The polyethylene polyamines may include, but are not limited to tetraethylenepentamine (TEPA) pentaethylenehexamine (PEHA), hexaethyleneheptamine (HEHA), polyethylene polyamines with greater than 7 amine groups, or mixtures of these. The amine corrosion inhibitor may include a mixture of polyethylene polyamines that are linear, cyclic, branched, or combinations of these.

When the amine corrosion inhibitor includes a mixture of polyethylene polyamines, the mixture of polyethylene polyamines may have a number average molecular weight greater than the molecular weight of hexaethylenehelptamine. The amine corrosion inhibitor may be a mixture of polyethylene polyamines having a number average molecular weight of greater than or equal to 190 grams per mole, such as greater than or equal to 230 grams per mole, or even greater than or equal to 250 grams per mole. The amine corrosion inhibitor may be a mixture of polyethylene polyamines having a number average molecular weight of from 190 grams per mole to 300 grams per mole, from 190 grams per mole to 250 grams per mole, from 190 grams per mole to 230 grams per mole, from 230 grams per mole to 300 grams per mole, from 230 grams per mole to 250 grams per mole, from or from 250 grams per mole to 300 grams per mole. The number average molecular weight ($M_n$) of the polyethylene polyamines may be calculated from the following Equation 1 (EQU. 1):

$$M_n = \frac{\sum_0^i N_i M_i}{\sum_0^i N_i}. \quad \text{EQU. 1}$$

In EQU. 1, $M_i$ is the molecular weight of a chain, $N_i$ is the number of chains of that molecular weight, and i is the number of polymer molecules.

The amine corrosion inhibitor may include at least one polyethylene polyamine. In embodiments, the at least one polyethylene polyamine of the amine corrosion inhibitor may include TEPA, PEHA, and HEHA. In embodiments, the amine corrosion inhibitor may consist or consist essentially of TEPA, PEHA, HEHA, or combinations of these. In embodiments, the at least one polyethylene polyamine of the amine corrosion inhibitor may include HEHA, a mixture of polyethylene polyamines having a number average molecular weight greater than the molecular weight of HEHA, or both. In embodiments, the amine corrosion inhibitor may consist of or consist essentially of HEHA, a mixture of polyethylene polyamines having a number average molecular weight greater than the molecular weight of HEHA, or both. The amine corrosion inhibitor may include a polyethylene polyamine selected from the group consisting of TEPA, PEHA, HEHA, a mixture of polyethylene polyamines having a number average molecular weight greater than the molecular weight of HEHA, or combinations of these. The amine corrosion inhibitor may be substantially free of monoethanolamine, triethanolamine, polyethyleneamines having less than 5 amine groups, or combinations of these. For example, the amine corrosion inhibitor may have less than 1 wt. % or even less than 0.1 wt. % monoethanolamine, triethanolamine, polyethyleneamines having less than 5 amine groups, or combinations of these, based on the total weight of the amine corrosion inhibitor. In embodiments, the amine corrosion inhibitor may not include monoethanolamine, triethanolamine, polyethyleneamines having less than 5 amine groups, or combinations of these.

The corrosion inhibiting cement composition may have an amount of the amine corrosion inhibitor sufficient to form the protective layer on the metal of the tubular strings during primary cementing. The corrosion inhibiting cement composition may include greater than or equal to 0.1 percent (%) BWOC, greater than or equal to 0.5% BWOC, greater than or equal to 1% BWOC, or even greater than or equal to 10% BWOC amine corrosion inhibitor. The corrosion inhibiting cement composition may include less than or equal to 60% BWOC, less than or equal to 40% BWOC, less than or equal to 20% BWOC, less than or equal to 10% BWOC, or even less than or equal to 5% BWOC amine corrosion inhibitor. The corrosion inhibiting cement composition may include from 0.1% BWOC to 60% BWOC, from 0.1% BWOC to 40% BWOC, from 0.1% BWOC to 20% BWOC, from 0.1% BWOC to 10% BWOC, from 0.1% BWOC to 5% BWOC, from 0.5% BWOC to 60% BWOC, from 0.5% BWOC to 40% BWOC, from 0.5% BWOC to 20% BWOC, from 0.5% BWOC to 10% BWOC, from 0.5% BWOC to 5% BWOC, from 1% BWOC to 60% BWOC, from 1% BWOC to 40% BWOC, from 1% BWOC to 20% BWOC, from 1% BWOC to 10% BWOC, from 1% BWOC to 5% BWOC, from 10% BWOC to 60% BWOC, from 10% BWOC to 40% BWOC, from 10% BWOC to 20% BWOC, from 20% BWOC to 60% BWOC, from 20% BWOC to 40% BWOC, or from 40% BWOC to 60% BWOC amine corrosion inhibitor.

The amine corrosion inhibitor may include at least one polyethylene polyamine, and the corrosion inhibiting cement composition may include from 0.1% BWOC to 60% BWOC, from 0.1% BWOC to 40% BWOC, from 0.1% BWOC to 20% BWOC, from 0.1% BWOC to 10% BWOC, from 0.1% BWOC to 5% BWOC, from 0.5% BWOC to 60% BWOC, from 0.5% BWOC to 40% BWOC, from 0.5% BWOC to 20% BWOC, from 0.5% BWOC to 10% BWOC, from 0.5% BWOC to 5% BWOC, from 1% BWOC to 60% BWOC, from 1% BWOC to 40% BWOC, from 1% BWOC to 20% BWOC, from 1% BWOC to 10% BWOC, or from 1% BWOC to 5% BWOC, from 10% BWOC to 60%

BWOC, from 10% BWOC to 40% BWOC, from 10% BWOC to 20% BWOC, from 20% BWOC to 60% BWOC, from 20% BWOC to 40% BWOC, or from 40% BWOC to 60% BWOC polyethylene polyamine.

The corrosion inhibiting cement composition includes a cement composition that may include at least a cement precursor and water. The cement composition may further include one or more of silica sand, silica flour, weighting agents, cement retarders, defoamers, or combinations of these. The cement composition may also include one or more additives, such as but not limited to, one or more of an expansion additive, a friction reducer, a gas block stabilizer, a dispersant, a surfactant, a latex, a latex stabilizer, epoxy resins, epoxy curing agents, or combinations of these. Other constituents known in the art of primary cementing may also be incorporated into the cement composition.

The cement precursor may be any suitable material which, when mixed with water, can be cured into a cement. The cement precursor may include hydraulic or non-hydraulic cement precursors. A hydraulic cement precursor may include a mixture of limestone, clay and gypsum burned together at temperatures greater than 1000 degrees Celsius (° C.). Cement compositions prepared with hydraulic cement precursors may harden instantly or within a few minutes when contacted with water. A non-hydraulic cement precursor may include mixtures of lime, gypsum, plasters, and oxychloride. Cement compositions prepared with non-hydraulic cement precursors may take longer to harden or may require drying conditions for proper strengthening, but may be more economically feasible. The cement precursor may include one or more classes of cement precursors identified by the American Petroleum Institute (API), such as an API Class G cement. The cement precursor may be a Portland cement precursor, such as but not limited to a Class G Portland cement. Portland cement is a hydraulic cement precursor (cement precursor material that not only hardens by reacting with water but also forms a water-resistant product) produced by pulverizing clinkers, which contain hydraulic calcium silicates and one or more of the forms of calcium sulphate as an inter-ground addition. The cement precursor may also include a Saudi Class G cement precursor, which may include a mixture of Portland cement and crystalline silica, which may be referred in the alternative as quartz.

The cement precursor may include one or more of calcium hydroxide, silicates, oxides, belite ($Ca_2SiO_4$), alite ($Ca_3SiO_5$), tricalcium aluminate ($Ca_3Al_2O_6$), tetracalcium aluminoferrite ($Ca_4Al_2Fe_2O_{10}$), brownmilleriate ($4CaO \cdot Al_2O_3 \cdot Fe_2O_3$), gypsum ($CaSO_4 \cdot 2H_2O$), sodium oxide, potassium oxide, limestone, lime (calcium oxide), hexavalent chromium, trivalent chromium, calcium aluminate, or combinations of these. The cement precursor material may include Portland cement, siliceous fly ash, calcareous fly ash, slag cement, silica fume, quartz, other cement precursor material, or any combination of these.

The cement composition may include Saudi Class G cement. Saudi Class G cement may include from 60 wt. % to 100 wt. %, from 60 wt. % to 99 wt. %, from 60 wt. % to 97 wt. %, from 60 wt. % to 95 wt. %, from 60 wt. % to 90 wt. %, from 60 wt. % to 80 wt. %, from 70 wt. % to 100 wt. %, from 70 wt. % to 99 wt. %, from 70 wt. % to 97 wt. %, from 70 wt. % to 95 wt. %, from 70 wt. % to 90 wt. %, from 70 wt. % to 80 wt. %, from 80 wt. % to 100 wt. %, from 80 wt. % to 99 wt. %, from 80 wt. % to 97 wt. %, from 80 wt. % to 95 wt. %, from 80 wt. % to 90 wt. %, from 90 wt. % to 100 wt. %, from 90 wt. % to 99 wt. %, from 90 wt. % to 97 wt. %, from 90 wt. % to 95 wt. %, from 95 wt. % to 100 wt. %, or from 95 wt. % to 99 wt. % Portland cement based on the total weight of the Saudi Class G cement precursor. Saudi Class G cement precursor may include less than 40 wt. %, less than 30 wt. %, less than 20 wt. %, less than 10 wt. %, less than 5 wt. %, less than 3 wt. %, or even less than 1 wt. % crystalline silica, or quartz based on the total weight of the Saudi Class G cement precursor. Saudi Class G cement precursor may have a pH greater than 7, such as from 8 to 14, from 10 to 13, from 11 to 13, from 12 to 13, or 12.4. Saudi Class G cement may have a bulk density at 20° C. of from 70 pounds per cubic foot ($lb/ft^3$) (1121 kilograms per cubic meter ($kg/m^3$), where 1 $lb/ft^3$ equals 16.0185 $kg/m^3$) to 120 $lb/ft^3$ (1922 $kg/m^3$), from 80 $lb/ft^3$ (1281 $kg/m^3$) to 110 $lb/ft^3$ (1762 $kg/m^3$), or from 90 $lb/ft^3$ (1442 $kg/m^3$) to 100 $lb/ft^3$ (1602 $kg/m^3$), or 94 $lb/ft^3$ (1506 $kg/m^3$). Saudi Class G cement precursor may have a solubility in water of from 0.1 grams per 100 milliliters (g/100 ml) to 2 g/100 ml, from 0.1 g/100 ml to 1 g/100 ml, from 0.1 g/100 ml to 0.8 g/100 ml, from 0.1 g/100 ml to 0.5 g/100 ml, from 0.2 g/100 ml to 2 g/100 ml, from 0.2 g/100 ml to 1 g/100 ml, from 0.2 g/100 ml to 0.8 g/100 ml, from 0.2 g/100 ml to 0.5 g/100 ml, from 0.5 g/100 ml to 2 g/100 ml, from 0.5 g/100 ml to 1 g/100 ml, from 0.5 g/ml to 0.8 g/100 ml, or 0.5 g/100 ml.

The cement composition, the corrosion inhibiting cement composition, or both, may include an amount of cement precursor sufficient to produce a hard rigid cement upon curing. The cement composition, the corrosion inhibiting cement composition, or both, may include greater than or equal to 10 wt. %, greater than or equal to 20 wt. %, greater than or equal to 30 wt. %, or greater than or equal to 50 wt. % cement precursor based on the total weight of the cement composition. The cement composition, the corrosion inhibiting cement composition, or both, may include less than or equal to 80 wt. %, less than or equal to 70 wt. %, or even less than or equal to 60 wt. % cement precursor based on the total weight of the cement composition. The cement composition, the corrosion inhibiting cement composition, or both, may include from 10 wt. % to 80 wt. %, from 10 wt. % to 70 wt. %, from 10 wt. % to 60 wt. %, from 10 wt. % to 50 wt. %, from 20 wt. % to 80 wt. %, from 20 wt. % to 70 wt. %, from 20 wt. % to 60 wt. %, from 20 wt. % to 50 wt. %, from 30 wt. % to 80 wt. %, from 30 wt. % to 70 wt. %, from 30 wt. % to 60 wt. %, from 30 wt. % to 50 wt. %, from 50 wt. % to 80 wt. %, from 50 wt. % to 70 wt. %, or from 50 wt. % to 60 wt. % cement precursor based on the total weight of the cement composition or the corrosion inhibiting cement composition. In embodiments, the cement composition, the corrosion inhibiting cement composition, or both, may include from 80 wt. % to 90 wt. % cement precursor based on the total weight of the cement composition.

Water may be added to the cement precursor and other constituents to produce the cement composition. The water in the cement compositions may include distilled water, deionized water, filtered water, or tap water. The water used to produce the cement composition may be in the form of an aqueous solution containing additives or contaminants. The water may include freshwater or seawater, natural or synthetic brine, salt water, municipal water, well water, formation water, produced water, brackish water, or combinations of these. Salts or other organic compounds may be incorporated into the water to control certain properties of the water, and thus control properties of the cement composition, such as density. Suitable salts may include, but are not limited to, alkali metal chlorides, hydroxides, or carboxylates. In embodiments, salts present in the water may include, but are not limited to, sodium, calcium, cesium, zinc, aluminum, magnesium, potassium, strontium, silicon, lithium, chlorides, bromides, carbonates, iodides, chlorates, bromates, formates, nitrates, sulfates, phosphates, oxides, fluorides, and combinations of these. The water may be substantially free of salts, such as having less than 1 wt. % salts based on the total weight of the water. The water may have less than 0.1 wt. % salts or even less than 0.01 wt. % salts based on the total weight of the water.

The cement composition, the corrosion inhibiting cement composition, or both, may include an amount of water sufficient to allow the cement composition to be pumped into the annulus and to cause curing of the corrosion inhibiting cement composition. The cement composition, the corrosion inhibiting cement composition, or both, may have greater than or equal to 5 wt.%, greater than or equal to 10 wt.%, or greater than or equal to 15 wt.% water based on the total weight of the cement composition or corrosion inhibiting cement composition, respectively. The cement composition, the corrosion inhibiting cement composition, or both, may include less than or equal to 70 wt.%, less than or equal to 60 wt.%, less than or equal to 50 wt.%, or even less than or equal to 40 wt.% water based on the total weight of the cement composition or corrosion inhibiting cement composition, respectively. The cement composition, the corrosion inhibiting cement composition, or both, may include from 5 wt.% to 70 wt.%, from 5 wt.% to 60 wt.%, from 5 wt.% to 50 wt.%, from 5 wt.% to 40 wt.%, from 5 wt.% to 20 wt.%, from 10 wt.% to 70 wt.%, from 10 wt.% to 60 wt.%, from 10 wt.% to 50 wt.%, from 10 wt.% to 40 wt.%, from 15 wt.% to 70 wt.%, from 15 wt.% to 60 wt.%, from 15 wt.% to 50 wt.%, or from 15 wt.% to 40 wt.% water based on the total weight of the cement composition or the corrosion inhibiting cement composition, respectively.

As previously discussed, the cement composition may include silica sand, silica flour, weighting agents, cement retarders, defoamers, or combinations of these. Silica sand, silica flour, or both may be included in the cement composition as strength stabilizing agents. Silica sand, silica flour, or both, may be used to stabilize the strength and permeability of the cement composition at downhole temperatures between 230° F. and 700° F. (110° C. and 371° C.), prevent strength retrogression, and decrease the permeability of the cured cement. Silica sand may include any naturally-occurring or man-made silica sand. The silica sand may have an average particle size of from 100 micrometers (μm) (microns) to 200 μm, from 100 μm to 180 μm, from 100 μm to 175 μm, from 150 μm to 200 μm, from 150 μm to 180 μm, from 150 μm to 175 μm, from 175 μm to 200 μm, or from 180 μm to 200 μm. The cement composition, the corrosion inhibiting cement composition, or both, may include from 0% BWOC to 50% BWOC silica sand, from 0% BWOC to 20% BWOC, from 0% BWOC to 10%, BWOC, from 1% BWOC to 50% BWOC, from 1% BWOC to 20% BWOC, from 1% BWOC to 10% BWOC, from 10% BWOC to 50% BWOC, or from 10% to 20% BWOC silica sand. In embodiments, the cement composition, the corrosion inhibiting cement composition, or both, may be substantially free of silica sand, such as having less than 1% BWOC, less than 0.1% BWOC, or even less than 0.01% BWOC silica sand. In embodiments, the cement composition, the corrosion inhibiting cement composition, or both may not include silica sand.

The silica flour may be any naturally-occurring or man-made silica flour. The silica flour may have an average particle size less than the silica sand. The silica flour may have an average particle size less than 100 μm, less than or equal to 75 μm, less than or equal to 50 μm, less than or equal to 25 μm, less than or equal to 15 μm, or even less than or equal to 10 μm. The silica flour may have an average particle size of from 1 μm to less than 100 μm, from 1 μm to 75 μm, from 1 μm to 50 μm, from 1 μm to 25 μm, from 1 μm to 15 μm, from 5 μm to less than 100 μm, from 5 μm to 75 μm, from 5 μm to 50 μm, from 5 μm to 25 μm, or from 5 μm to 15 μm. The silica flour may be used in combination with silica sand to formulate the cement composition with a density of from 130 lb/ft$^3$ (2082 kg/m$^3$) to 165 lb/ft$^3$ (2643 kg/m$^3$), which may provide for resistance of gas migration problems through the cured cement. The combination of the silica sand and silica flour may increase the solids packing density of the cement composition, the corrosion inhibiting cement composition, or both, and thus reduce the permeability of the cured cement to gas flow, among other features.

The cement composition, the corrosion inhibiting cement composition, or both, may include from greater than 0% BWOC to 50% BWOC, from greater than 0% BWOC to 40% BWOC, from greater than 0% BWOC to 30% BWOC, from greater than 0% BWOC to 20% BWOC, from 1% BWOC to 50% BWOC, from 1% BWOC to 40% BWOC, from 1% BWOC to 30% BWOC, from 1% BWOC to 20% BWOC, from 5% BWOC to 50% BWOC, from 5% BWOC to 40% BWOC, from 5% BWOC to 30% BWOC, from 5% BWOC to 20% BWOC silica flour. In embodiments, the cement composition, the corrosion inhibiting cement composition, or both, may be substantially free of silica flour, such as having less than 1% BWOC silica flour, less than 0.1% BWOC, or even less than 0.01% BWOC silica flour. In embodiments, the cement composition, the corrosion inhibiting cement composition, or both, may not include silica flour.

As previously discussed, the cement composition may include a weighting agent, which may also be referred to as a "weighting material" or "weight material." The weighting agent may include particulate solids having a specific gravity (SG) sufficient to increase the density of the cement slurry. Examples of weighting agents may include, but are not limited to, sand, barite (barium sulfate), hematite, calcium carbonate, siderite, ilmenite, silica sand, manganese oxide (MnO), hausmanite (manganese tetroxide ($Mn_3O_4$)), zinc oxide, zirconium oxide, iron oxide, fly ash, or any combination of these weighting agents. The cement composition may include one weighting agent or a combination of two or more different weighting agents, each with different properties. The weighting agents can be obtained from any readily available source. The weighting agent may have a specific gravity (SG) of from 2 to 6, from 2 to 5, from 3 to 6, or from 3 to 5. The weighting agents may have a mean particle size distribution of from 0.1 μm to 50 μm, or from 0.1 μm to 40 μm, from 0.1 μm to 30 μm, from 0.1 μm to 20 μm, from 0.1 μm to 10 μm, from 10 μm to 50 μm, from 10 μm to 40 μm, from 10 μm to 30 μm, from 10 μm to 20 μm, from 20 μm to 50 μm, from 20 μm to 40 μm, from 20 μm to 30 μm, from 30 μm to 50 μm, from 30 μm to 40 μm, or from 40 μm to 50 μm. The cement composition, the corrosion inhibiting cement composition, or both, may include from 10% BWOC to 150% BWOC, from 10% BWOC to 125% BWOC, from 10% BWOC to 100%, from 10% BWOC to 75% BWOC, from 10% BWOC to 50% BWOC, from 20% BWOC to 150% BWOC, from 20% BWOC to 125% BWOC, from 20% BWOC to 100% BWOC, from 20% BWOC to 75% BWOC, from 20% BWOC to 50% BWOC, from 50% BWOC to 150% BWOC, from 50% BWOC to 125% BWOC, from 50% BWOC to 100% BWOC, from 50% BWOC to 75% BWOC, from 75% BWOC to 150% BWOC, or from 100% BWOC to 150% BWOC weighting agent.

In embodiments, the cement composition, the corrosion inhibiting cement composition, or both, may be substantially free of weighting agents, such as having less than 1% BWOC, less than 0.1% BWOC, or even less than 0.01% BWOC weighting agents. In embodiments, the cement composition, the corrosion inhibiting cement composition, or both, may not include weighting agents.

The addition of one or more of these components to the cement composition may reduce settling in the cement composition. In some embodiments, the inclusion of one or more of the silica sand, silica flour, weighting agent, or combinations of these may reduce the porosity of the cement composition by including different particle size distributions of particles and components.

As previously discussed, the cement compositions may further include a cement retarder. The cement retarders may decrease the curing rate of the cement composition. Amines in the amine corrosion inhibitor may have the added effect of increasing the curing rate of the corrosion inhibiting cement composition. Thus, adding cement retarders to the cement composition may operate to at least partially counteract the effects of the amine corrosion inhibitor with respect to curing rate and may decrease the curing rate of the corrosion inhibiting composition. The cement retarder may include both high temperature cement retarders and low temperature cement retarders. A high temperature cement retarder may operate to reduce the curing rate of the cement compositions at temperatures from 180° F. to 450° F. (from 82° C. to 232° C.). A low temperature cement retarder may operate to reduce the curing rate of the cement compositions at temperatures from 120° F. to 180° F. (from 49° C. to 82° C.). The low temperature cement retarder may include calcium lignosulfonate. The high temperature cement retarder may include ethylene glycol or a mixture of a sodium salt of an organic acid and an inorganic salt. Other cement retarders that can be used in the cement compositions may include, but are not limited to, modified lignosulfonates, sulfamethylated lignins, inorganic salts, acrylic polymers, sodium lignosulfonates, sodium tetraborate, aromatic polymer derivatives, a mixture of a sodium salt of alicyclic acid and an aminated aromatic polymer, an aliphatic amide polymer, scleroglucan, copolymers of isobutene and maleic anhydride, amino-N-([alkylidene] phosphonic acid) derivatives, alkanolamine-hydroxy carboxy acid salts (for example, tartaric acid and ethanolamine), phosphonocarboxylic acids, dicyclopentadiene bis(methylamine) methylene phosphonate, lignosulfonate derivatives, carbohydrates grafted with vinyl polymers, carboxymethyl hydroxyethylcellulose, wellan gum, Borax, carrageenan, polyethylene amine derivatives and amides, copolymers from maleic acid and 2-acrylamido-2 methylpropane sulfonic acid, ethylenediamine-tetramethylene phosphonic acid, polyoxyethylene phosphonic acid, citric acid, polyacrylic acid phosphinate, or combinations of these.

The cement composition, the corrosion inhibiting cement composition, or both, may include an amount of the cement retarders sufficient to decrease the rate of curing of the corrosion inhibiting cement composition so that the corrosion inhibiting cement composition can be dispensed into the annulus before curing into a cured cement. The cement compositions, corrosion inhibiting cement compositions, or both may include less than or equal to 10% BWOC cement retarders, such as less than or equal to 5% BWOC, or even less than or equal to 3% BWOC cement retarders. The cement compositions, corrosion inhibiting cement compositions, or both may include from greater than 0.0% BWOC to 10% BWOC, from greater than 0.0% BWOC to 5% BWOC, from greater than 0.0% BWOC to 3% BWOC, from 0.1% BWOC to 10% BWOC, from 0.1% BWOC to 5% BWOC, from 0.1% BWOC to 3% BWOC, from 1% BWOC to 10% BWOC, from 1% BWOC to 5% BWOC, or from 1% BWOC to 3% BWOC cement retarders. In embodiments, the cement compositions, the corrosion inhibiting cement compositions, or both may include less than 1% BWOC, less than 0.1% BWOC, or even less than 0.01% BWOC cement retarders. In embodiments, the cement compositions, the corrosion inhibiting cement compositions, or both, do not include cement retarders.

The cement composition, the corrosion inhibiting cement composition, or both, may include from 0.1% BWOC to 10% BWOC surfactant. The cement composition may include one or a plurality of defoamers. The defoamers, or "anti-foam additives," may be added to the cement composition to prevent frothing, foaming, and vapor entrapment that may occur during the mixing process of a cement slurry. The cement composition, the corrosion inhibiting cement composition, or both, may include less than 5 gps defoamer, where gps refers to U.S. gallons per sack of cement precursor. The cement composition, the corrosion inhibiting cement composition, or both, may include less than or equal to 1 gps defoamer, or even less than or equal to 0.5 gps defoamer. In embodiments, the cement composition, corrosion inhibiting cement composition, or both, may be substantially free of defoamers, such as having less than or equal to 1% BWOC, less 0.1% BWOC, or even less than 0.01% BWOC defoamer. In embodiments, the cement composition, corrosion inhibiting cement composition, or both, do not include defoamers.

The cement composition, and thus the corrosion inhibiting cement composition, may further include one or a plurality of latex additives and a latex stabilizer. As used in this disclosure, "latex" may refer to rubber materials commercially available in aqueous latex form, such as aqueous dispersions or emulsions. Latex additives may be added to the cement composition to enhance the mechanical properties of the cured cement, such as but not limited to decreasing the elastic modulus, improving the tensile strength, and improving the compressive strength of the cured cement. Decreasing the elastic modulus of the cured cement may reduce brittleness, which may improve performance of the corrosion inhibiting cement compositions in cementing zones that produce gas with gas flow potentials and formation gas pressures in ranges that can cause concern for production.

The latex additives may include an aqueous fluid and a solid elastomer. The latex additive can be any type of preformed latex containing the solid elastomer dispersed in the aqueous fluid to form an emulsion. The amount of aqueous fluid in the latex additive can be about 50 wt.% based on the total weight of the latex additive. The aqueous latex additive can be formed by polymerization of monomers in an emulsion polymerization process, where the polymerization of monomers forms the dispersed solid elastomer. The aqueous fluid may be water from any of the sources of water previously discussed in the present disclosure.

The solid elastomer can be any film forming elastomer containing butadiene monomers, styrene monomers, acrylonitrile monomers, ethylene monomers, vinyl acetate monomers, and combinations of these monomers. In embodiments, the solid elastomer may include butadiene monomer, styrene monomer, acrylonitrile monomer, and combinations of the same. In embodiments, the solid elastomer may include a combination of ethylene monomer and vinyl acetate monomer. The ratio of the different monomers can vary depending on the solid elastomer. The solid elastomer can also include a polar monomer in an amount from 1 wt. % to 10 wt. % based on the total weight of the solid elastomer. Examples of polar monomers can include but are not limited to acrylic acid salt and 2-acrylamide-2-methyl propane sulfonic acid salt. The polar monomer can be present to reinforce the stability of the emulsion of the aqueous latex. Examples of solid elastomers employed in latex additives may include, but are not limited to, natural rubbers such as (cis-1,4-polyisoprene), modified types of these, synthetic polymers, or combinations of these. The synthetic polymers may include styrene/butadiene rubber, cis-1,4-polybutadiene, high styrene resin, butyl rubber, ethylene/propylene rubber, neoprene rubber, nitrile rubber, cis-1,4-polyisoprenerubber, silicone rubber, chlorosulfonated rubber, polyethylene rubber, epichlorohydrin rubber, fluorocarbon rubber, fluorosilicone rubber, polyurethane rubber, polyacrylic rubber, or polysulfide rubber. The aqueous latex additives can be commercially available aqueous latex additives. The aqueous latex additives can also include one or more liquid elastomers dispersed in the aqueous latex additive.

The cement composition, the corrosion inhibiting cement composition, or both may include from 0.0% BWOC to 50% BWOC, from 0.0% BWOC to 30% BWOC, from 0.0% BWOC to 20% BWOC, from 0.1% BWOC to 50% BWOC, from 0.1% BWOC to 30% BWOC, from 0.1% BWOC to 20% BWOC, from 1% BWOC to 50% BWOC, from 1% BWOC to 30% BWOC, from 1% BWOC to 20% BWOC, from 5% BWOC to 50% BWOC, from 5% BWOC to 30% BWOC, or from 5% BWOC to 20% BWOC latex additive. In embodiments, the cement composition, the corrosion inhibiting cement composition, or both may be substantially free of latex additive, such as having less than 1% BWOC or even less than 0.1% BWOC latex additive. In embodiments, the cement composition, the corrosion inhibiting cement composition, or both do not include a latex additive.

When the latex additive is present, the cement composition, corrosion inhibiting cement composition, or both, may include a latex stabilizer, which may be operable to reduce or prevent de-emulsification of the latex additive when contacted with water in the cement composition. The latex stabilizer may include one or more surfactants operable to maintain the emulsion of the latex additive. The surfactant of the latex stabilizer can be any type of surfactant capable of stabilizing the latex additive. Examples of the surfactant can include anionic surfactants, non-ionic surfactants, or combinations of these surfactants. Examples of anionic surfactants can include, but are not limited to, sodium dodecylbenzene sulfonate, sodium lauryl sulfonate, a sulfate salt of a nonylphenol ethoxylate containing 20-40 moles of ethylene oxide, or combinations of these surfactants. Examples of the non-ionic surfactants can include, but are not limited to, a nonylphenol ethoxylate containing 20-40 moles of ethylene oxide. The cement composition, corrosion inhibiting cement composition, or both may include from 0.0% BWOC to 10% BWOC latex stabilizer, such as from 0.1% BWOC to 10% BWOC, from 0.1% BWOC to 5% BWOC, from 1% BWOC to 10% BWOC, or from 1% BWOC to 5% BWOC latex stabilizer. In embodiments, the cement composition, corrosion inhibiting cement composition, or both may be substantially free of latex stabilizers, such as having less than or equal to 1% BWOC, less than 0.1% BWOC, or even less than 0.01% BWOC latex stabilizer. In embodiments, the cement composition, corrosion inhibiting cement composition, or both, do not include latex stabilizers.

The cement composition may include additives, such as but not limited to, expansion additives, dispersants, fluid loss additives, friction reducers, gas block stabilizers, other additives, or combinations of these. The cement composition may include an expansion additive. The expansion additive can be selected from known expansion additive compounds. Examples of expansion additives may include metal oxides, examples of which include, but are not limited to, calcium oxide (CaO), magnesium oxide (MgO), metal oxides of zinc, magnesium, iron, aluminum powders, or combinations of these. In embodiments, the expansion additive may be a calcined magnesium oxide. In embodiments, the expansion additive may be a mixture of calcium oxide and magnesium oxide. During curing, hydration of magnesium oxide to magnesium hydroxide may provide an expansive force within the cement matrix. Diameters of tubular strings, such casings and liners, may be affected by changes in temperature and pressure, and therefore, the diameters of such tubular strings may be reduced or expanded, which can lead to the formation of a microannulus. The expansion additive may be used in the cement composition to maintain a seal around the tubular string and against the wellbore wall of the wellbore to achieve superior bonding.

The cement composition, corrosion inhibiting cement composition, or both, may include less than or equal to 10% BWOC expansion additive or less than or equal to 5% BWOC expansion additive. The cement composition, corrosion inhibiting cement composition, or both, may include from 0.0% BWOC to 10% BWOC, from 0.0% BWOC to 5% BWOC, from 0.1% BWOC to 10% BWOC, from 0.1% BWOC to 5% BWOC, or from 1% BWOC to 10% BWOC expansion additive. In embodiments, the cement composition, corrosion inhibiting cement composition, or both, may be substantially free of expansion additives, such as less than 1% BWOC, less than 0.1% BWOC, or even less than 0.01% BWOC expansion additive. In embodiments, the cement composition, corrosion inhibiting cement composition, or both, do not include expansion additives.

The cement compositions may include a dispersant containing one or more anionic groups. The dispersant may include synthetic sulfonated polymers, lignosulfonates with carboxylate groups, hydroxylated sugars, other anionic groups, or combinations of any of these. The cement composition, corrosion inhibiting cement composition, or both, may include from 0.0% BWOC to 10% BWOC dispersant. In embodiments, the cement composition, corrosion inhibiting cement composition, or both, maybe substantially free of dispersants, such as having less than 1% BWOC, less than 0.1% BWOC, or even less than 0.01% BWOC dispersant. In embodiments, the cement composition, corrosion inhibiting cement composition, or both, do not include dispersants.

The cement compositions may include a fluid loss additive. The fluid loss additive may include non-ionic cellulose derivatives, such as, but not limited to, hydroxyethylcellulose (HEC). Alternatively or additionally, the fluid loss additive may be a non-ionic synthetic polymer, such as but not limited to, polyvinyl alcohol or polyethyleneimine. The fluid loss additive may also include one or more anionic synthetic polymers, such as, but not limited to, 2-acrylamido-2-methylpropane sulfonic acid (AMPS) or AMPS-copolymers, including lattices of AMPS-copolymers. The fluid loss additive may include bentonite. The fluid loss additive may include an acrylamide copolymer, an aliphatic amide polymer, an acrylic polymer, bentonite, latex polymers, gilsonite, additives to latex (for example, styrene-butadiene latex in combination with nonionic and anionic surfactants), octylphenol ethoxylate, polyethylene oxide, copolymers of maleic anhydride, 2-hydroxypropyl acrylate, or combinations of these. The cement composition, corrosion inhibiting cement composition, or both, may include less than or equal to 5% BWOC, less than or equal to 1% BWOC, or even less than or equal to 0.5% BWOC fluid loss additive. The cement composition, corrosion inhibiting cement composition, or both, may include from 0.001% BWOC to 5% BWOC, from 0.001% BWOC to 1% BWOC, from 0.001% BWOC to 0.5% BWOC, or from 0.001% BWOC to 0.01% BWOC fluid loss additive. In embodiments, the cement composition, corrosion inhibiting cement composition, or both, do not include fluid loss additives.

The cement composition may include a friction reducer. The friction reducer may be a sulfonic acid salt or an aromatic polymer derivative. Other cement friction reducers may include, but are not limited to, polyoxyethylene sulfonate, acetone formaldehyde cyanide resins, polyoxethylated octylphenol, copolymers of maleic anhydride and 2-hydroxypropyl acrylate, allyloxybenzene sulfonate, allyloxybenzene phosphonate, ferrous lignosulfonate, ferrous sulfate, tannic acid, alkali lignosulfonate, acetone polycondensate, formaldehyde polycondensate, sulfonated naphthalene formaldehyde condensate, sulfonated indene resins and sulfonated indene-cumarone resins, melamine sulfonate polymers, vinyl sulfonate polymers, styrene sulfonate polymers, polyethyleneimine phosphonate, casein polysaccharides, or combinations of these. The cement composition, corrosion inhibiting cement composition, or both, may include less than or equal to 10% BWOC friction reducer, such as less than or equal to 5% BWOC, less than or equal to 1% BWOC, or even less than or equal to 0.5% BWOC friction reducer. The cement composition, corrosion inhibiting cement composition, or both, may include from 0.0% BWOC to 10% BWOC, from 0.0% BWOC to 5% BWOC, from 0.0% BWOC to 1% BWOC, from 0.0% BWOC to 0.5% BWOC, from 0.001% BWOC to 10% BWOC, from 0.001% BWOC to 5% BWOC, from 0.001% BWOC to 1% BWOC, or from 0.001% BWOC to 0.5% BWOC friction reducer. In embodiments, the cement composition, corrosion inhibiting cement composition, or both, do not include friction reducers.

The cement composition may include a gas block stabilizer. Gas block stabilizers may include, but are not limited to, an aminated aromatic salt, an alkyl ether sulfate, an aminated aromatic polymer, or combinations of these. The cement composition, corrosion inhibiting cement composition, or both, may comprise less than 10 gallons per sack of cement (gps), less than or equal to 5 gps, or even less than or equal to 1 gps gas block stabilizer. The cement composition, corrosion inhibiting cement composition, or both, may include from 0.0 gps to 10 gps, from 0.0 gps to 5 gps, from 0.0 gps to 1 gps, from 0.1 gps to 10 gps, from 0.1 gps to 5 gps, from 0.1 gps to 1 gps, from 1 gps to 10 gps, or from 1 gps to 5 gps of gas block stabilizer. In embodiments, the cement composition, corrosion inhibiting cement composition, or both, do not include gas block stabilizers.

The corrosion inhibiting cement compositions may be prepared by preparing the cement composition comprising at least the cement precursor and water, combining the amine corrosion inhibitor and the cement composition to produce the corrosion inhibiting cement composition, and mixing the corrosion inhibiting cement composition. The cement composition may be prepared by combining the cement precursor and water and mixing to produce the cement composition. Preparing the cement composition may also include combining one or more of silica sand, silica flour, weighting agents, defoamers, cement retarders, surfactants, latex, latex stabilizers, or combinations of these, with the cement precursor and water before or during mixing. Preparing the cement composition may further include adding one or a plurality of optional additives, such as but not limited to expansion additives, friction reducers, fluid loss additives, dispersants, gas block stabilizers, other additives, or combinations of these, to the cement composition before or after mixing. In embodiments, the amine corrosion inhibitor may be added as the final constituent of the corrosion inhibiting cement composition just before use. After adding the amine corrosion inhibitor, the corrosion inhibiting cement composition may be mixed for a period of time sufficient to produce a homogeneous mixture. In embodiments, the corrosion inhibiting cement composition may be mixed for a period of from 10 minutes to 50 minutes, from 10 minutes to 40 minutes, from 10 minutes to 30 minutes, from 10 minutes to 20 minutes, from 15 minutes to 50 minutes, from 15 minutes to 40 minutes, from 15 minutes to 30 minutes, from 15 minutes to 20 minutes, from 20 minutes to 50 minutes, from 20 minutes to 40 minutes, from 20 minutes to 30 minutes, or about 30 minutes.

In embodiments, the corrosion inhibiting cement composition for reducing corrosion of wellbore casings may include from 10 wt. % to 70 wt. % cement precursor based on the total weight of the corrosion inhibiting cement composition, from 5 wt. % to 70 wt. % water based on the total weight of the corrosion inhibiting cement composition, and from 0.1 percent BWOC to 60 percent BWOC polyethylene polyamine. The cement precursor may be an API class G cement. The polyethylene polyamine may include at least one of tetraethylenepentamine (TEPA), pentaethylenehexamine (PEHA), hexaethyleneheptamine (HEHA), and one or more polyethylene polyamines having molecular weights greater than a molecular weight of hexaethyleneheptamine. The polyethylene polyamine may be selected from the group consisting of tetraethylenepentamine (TEPA), pentaethylenehexamine (PEHA), hexaethyleneheptamine (HEHA), and one or more polyethylene polyamines having molecular weights greater than a molecular weight of hexaethyleneheptamine. The polyethylene polyamine may include hexaethyleneheptamine (HEHA), one or more polyethylene polyamines having molecular weights greater than a molecular weight of hexaethyleneheptamine, or both. In embodiments, the polyethylene polyamine comprises, consists of, or consists essentially of tetraethylenepentamine (TEPA), pentaethylenehexamine (PEHA), hexaethyleneheptamine (HEHA), and one or more polyethylene polyamines having molecular weights greater than a molecular weight of hexaethyleneheptamine. The corrosion inhibiting cement composition may include from 5% BWOC to 50% BWOC silica flour. The corrosion inhibiting cement composition may include from 10% BWOC to 150% BWOC weighting agent. The corrosion inhibiting cement composition may further include from greater than 0% BWOC to less than or equal to 10% BWOC cement retarder. The corrosion inhibiting cement composition may further include from greater than 0% BWOC to less than or equal to 10% BWOC expansion additive, from greater than 0% BWOC to less than or equal to 5% BWOC defoamer, from greater than 0% BWOC to less than or equal to 10% BWOC latex, and from greater than 0% BWOC to less than or equal to 10% BWOC latex stabilizer. Any of the other additives previously discussed in the present disclosure may also be incorporated into the corrosion inhibiting cement compositions.

The corrosion inhibiting cement compositions of the present disclosure can be prepared with different density, viscosity, and mechanical properties by changing the concentrations of one or more constituents of the corrosion inhibiting cement composition. Thus, the corrosion inhibiting cement composition may be adapted for use in different downhole conditions of the wellbore. The corrosion inhibiting cement compositions of the present application may be adjusted to modify the rheology, density, and compressive strength of the cement composition, which may reduce or prevent the well integrity from being compromised during the well's lifetime.

The corrosion inhibiting cement composition may have a density of from 65 pounds per cubic foot (pcf) to 180 pcf (1041 kilograms per cubic meter ($kg/m^3$) to 2883 $kg/m^3$; where 1 pcf is equal to 16.02 $kg/m^3$). In embodiments, the corrosion inhibiting cement composition may have a density of from 65 pcf to 160 pcf, from 65 pcf to 140 pcf, from 65 pcf to 125 pcf, from 120 pcf to 180 pcf, from 120 pcf to 160 pcf, from 120 pcf to 140 pcf, from 125 pcf to 180 pcf, from 125 pcf to 160 pcf, from 125 pcf to 140 pcf, from 140 pcf to 180 pcf, from 140 pcf to 160 pcf, or from 160 pcf to 180 pcf.

The corrosion inhibiting cement compositions may have a Bearden consistency (BC) of from 50 to 100 BC when measured using a high temperature high pressure (HTHP) consistometer according to the test methods provided subsequently in this disclosure. In measuring the Bearden consistency, the temperature of the corrosion inhibiting cement composition may be increased to a temperature of 150° F. (65° C.) to simulate a bottom hole circulating temperature (BHCT) of 150° F. (65° C.), and the pressure of corrosion inhibiting cement composition may be ramped up to a final pressure of 1389 pounds per square inch (psi) (9576 kPa). The corrosion inhibiting cement composition may have a BC of from 50 BC to 90 BC, from 50 BC to 80 BC, from 50 BC to 70 BC, from 60 BC to 100 BC, from 60 BC to 90 BC, from 60 BC to 80 BC, from 60 BC to 70 BC, from 70 BC to 100 BC, from 70 BC to 90 BC, from 70 BC to 80 BC, from 80 BC to 100 BC, from 80 BC to 90 BC, or from 90 BC to 100 BC when measured using the HTHP consistometer according to the test methods provided subsequently in this disclosure.

Before introducing the corrosion inhibiting cement composition to the wellbore or annulus and before any substantial curing of the cement has taken place (such as within less than 20 minutes after combining the amine corrosion inhibitor with the cement composition to produce the corrosion inhibiting cement composition), the corrosion inhibiting cement composition may have a plastic viscosity (PV) of from 1 centipoise (cP) to 200 cP when measured at a temperature from 70° F. to 300° F. (21° C. to 149° C.) according to the test methods provided subsequently in this disclosure. The corrosion inhibiting cement composition may have a PV of from 1 cP to 150 cP, from 1 cP to 100 cP, from 1 cP to 50 cP, from 10 cP to 200 cP, from 10 cP to 150 cP, from 10 cP to 100 cP, from 10 cP to 50 cP, from 20 cP to 200 cP, from 20 cP to 150 cP, from 20 cP to 100 cP, or from 20 cP to 50 cP when measured at temperatures from 70° F. to 300° F. (21° C. to 149° C.) according to the test methods provided subsequently in this disclosure.

Before introducing the corrosion inhibiting cement composition to the wellbore or annulus and before any substantial curing has taken place (such as within less than 20 minutes after combining the amine corrosion inhibitor with the cement composition to produce the corrosion inhibiting cement composition), the corrosion inhibiting cement composition may have a yield point (YP) of from 50 to 200 when measured at about 70° F. to about 300° F. (about 21° C. to about 149° C.) according to the test methods provided subsequently in this disclosure. In embodiments, the corrosion inhibiting cement composition may have a YP of from 50 to 150, from 50 to 100, from 50 to 75, from 60 to 200, from 60 to 150, from 60 to 100, from 60 to 75, from 75 to 200, from 75 to 150, or from 75 to 100 when measured at about 70° F. to about 300° F. (about 21° C. to about 149° C.) according to the test methods provided subsequently in this disclosure. In embodiments, the corrosion inhibiting cement compositions may have a YP of from 50 to 100 when measured at 181° F. (about 83° C.) according to the test methods provided subsequently in this disclosure.

The corrosion inhibiting cement composition may have a gel strength before curing that enables the corrosion inhibiting cement composition to suspend the weighting materials and other solids added to increase the density of the corrosion inhibiting cement composition while maintaining the pump-ability of the corrosion inhibiting cement composition to prevent stuck-pipe problems. The corrosion inhibiting cement compositions may have a 10-second gel strength of from 1.0 pound of force per square foot (lbf/100 $ft^2$) to 30 lbf/100 $ft^2$, from 1 lbf/100 $ft^2$ to 25 lbf/100 $ft^2$, from 1 lbf/100 $ft^2$ to 20 lbf/100 $ft^2$, from 5 lbf/100 $ft^2$ to 30 lbf/100 $ft^2$, from 5 lbf/100 $ft^2$ to 25 lbf/100 $ft^2$, from 5 lbf/100 $ft^2$ to 20 lbf/100 $ft^2$, from 10 lbf/100 $ft^2$ to 30 lbf/100 $ft^2$, from 10 lbf/100 $ft^2$ to 25 lbf/100 $ft^2$, or from 10 lbf/100 $ft^2$ to 20 lbf/100 $ft^2$ measured immediately after addition of the amine corrosion inhibitor and before substantial curing has taken place, such as within 20 minutes of adding the amine corrosion inhibitor to the corrosion inhibiting cement composition. The corrosion inhibiting cement compositions may have a 10-minute gel strength of from 1 lbf/100 $ft^2$ to 60 lbf/100 $ft^2$, from 1 lbf/100 $ft^2$ to 55 lbf/100 $ft^2$, from 1 lbf/100 $ft^2$ to 50 lbf/100 $ft^2$, from 10 lbf/100 $ft^2$ to 60 lbf/100 $ft^2$, from 10 lbf/100 $ft^2$ to 55 lbf/100 $ft^2$, from 10 lbf/100 $ft^2$ to 50 lbf/100 $ft^2$, from 20 lbf/100 $ft^2$ to 60 lbf/100 $ft^2$, from 20 lbf/100 $ft^2$ to 55 lbf/100 $ft^2$, from 20 lbf/100 $ft^2$ to 50 lbf/100 $ft^2$, from 30 lbf/100 $ft^2$ to 60 lbf/100 $ft^2$, from 30 lbf/100 $ft^2$ to 55 lbf/100 $ft^2$, from 30 lbf/100 $ft^2$ to 50 lbf/100 $ft^2$, from 40 lbf/100 $ft^2$ to 60 lbf/100 $ft^2$, or from 40 lbf/100 $ft^2$ to 55 lbf/100 $ft^2$ when measured immediately after addition of the amine corrosion inhibitor and before substantial curing has taken place, such as within 20 minutes of adding the amine corrosion inhibitor to the corrosion inhibiting cement composition. The 10-second gel strength and 10-minute gel strength of the corrosion inhibiting cement compositions may be determined according to the test methods subsequently described in this disclosure.

Before any substantial curing has taken place (such as within less than 20 minutes after combining the amine corrosion inhibitor with the cement composition to produce the corrosion inhibiting cement composition), the corrosion inhibiting cement composition may have a fluid loss of from 0 to 400 cubic centimeters per 30 minutes ($cm^3$/30 min) measured according to the test methods provided subsequently in this disclosure. In embodiments, prior to curing the corrosion inhibiting cement composition, the free fluid of the corrosion inhibiting cement composition may be less than or equal to 10%, less than or equal to 5%, less than or equal to 3%, less than or equal to 2%, less than or equal to 1%, or even less than or equal to 0.1% measured according to the test methods provided subsequently in this disclosure. In embodiments, prior to curing the corrosion inhibiting cement compositions, the free fluid of the corrosion inhibiting cement compositions is about 0%.

The corrosion inhibiting cement compositions of the present disclosure may have a thickening time of from 0.5 hours to 24 hours according to the test methods provided subsequently in this disclosure. In embodiments, the corrosion inhibiting cement compositions may have a thickening time of from 0.5 hours to 12 hours, from 0.5 hours to 8 hours, from 0.5 hours to 6 hours, from 0.5 hours to 4 hours, from 0.5 hours to 3 hours, from 1 hour to 24 hours, from 1 hour to 12 hours, from 1 hour to 8 hours, from 1 hours to 6 hours, from 1 hours to 4 hours, from 1 hour to 3 hours, from 2 hours to 24 hours, from 2 hours to 12 hours, from 2 hours to 8 hours, from 2 hours to 6 hours, or from 2 hours to 4 hours.

The corrosion inhibiting cement compositions of the present disclosure may have a cure time of from 0.5 hours to 24 hours according to the test methods provided subsequently in this disclosure. In embodiments, the corrosion inhibiting cement compositions may have a cure time of from 0.5 hours to 12 hours, from 0.5 hours to 8 hours, from 0.5 hours to 6 hours, from 0.5 hours to 4 hours, from 0.5 hours to 3 hours, from 1 hour to 24 hours, from 1 hour to 12 hours, from 1 hour to 8 hours, from 1 hours to 6 hours, from 1 hours to 4 hours, from 1 hour to 3 hours, from 2 hours to 24 hours, from 2 hours to 12 hours, from 2 hours to 8 hours, from 2 hours to 6 hours, or from 2 hours to 4 hours.

Test Methods

Viscosity

The viscosity of the cement compositions may be measured using a standard oilfield viscometer, such as a FANN® Model 35 viscometer manufactured by Fann Instrument Company for example, according to test methods provided in the API Recommended Practice For Cementing (RP 10B). The viscosity is reported as shear stress in units of pounds of force per 100 square feet ($lbf/100\ ft^2$). The viscometer may also be used to measure the shear rate of the cement compositions.

Gel Strength

The gel strength refers to the shear stress of the cement composition measured at a reduced shear rate following a defined period of time during which the cement composition is maintained in a static state. The shear stress of the composition at reduced shear rate may be measured using a standard oilfield viscometer, such as a FANN® Model 35 viscometer operated at reduced rotations per minute ("rpms"), such as at 3 rpm, according to the test methods described in API Recommended Practice On Determining the Static Gel Strength of Cement Formulations (RP 10B-6/ISO 10426-6:2008). To measure the gel strength, the cement composition is first stirred by contacting the composition with the spindle of the viscometer and operating the viscometer at 600 rotations per minute (rpm). The viscometer is then turned off for period of time (time period). For a 10-second gel strength the time period is 10 seconds, and for a 10-minute gel strength the time period is 10 minutes. It should be understood that other time periods for measuring gel strength may be used as reference times for measurements of gel strength. During the time period, the composition comes to rest in a static state. Upon expiration of the time period, the viscometer is turned back on at a reduced speed, such as 3 rpm for example, to generate a reduced shear rate. The viscometer reading is then taken. The gel strength of the cement composition is reported in units of pounds of force per 100 square feet ($lbf/100\ ft^2$).

Rheology

The rheology of the cement compositions may be modeled based on Bingham plastic flow behavior. In particular, the cement compositions may behave as a rigid body at lesser shear stress but flow as a viscous fluid at greater shear stress. The rheological behavior of the cement compositions may be determined by measuring the shear stress on the composition at different shear rates, which may be accomplished by measuring the shear stress, the shear rate, or both on the composition using a FANN® Model 35 viscometer operated at 3 rpm, 6 rpm, 100 rpm, 200 rpm, 300 rpm, or 600 rpm, for example. The rheology of the cement compositions may be evaluated from the plastic viscosity (PV) and the yield point (YP), which are parameters from the Bingham plastic rheology model. The PV is related to the resistance of the composition to flow due to mechanical interaction between the solids of the composition and represents the viscosity of the composition extrapolated to infinite shear rate. The PV reflects the type and concentration of the solids, such as weighting materials, in the cement compositions, and a lesser PV is preferred. The PV of the cement compositions may be estimated by measuring the shear stress of the composition using a FANN® Model 35 viscometer at spindle speeds of 300 rotations per minute (rpm) and 600 rpm and subtracting the 300 rpm viscosity measurement from the 600 rpm viscosity measurement according to Equation 2 (EQU. 2), which is subsequently provided. The PV values determined for the cement compositions are provided in this disclosure in units of centipoise (cP).

$$PV=(\text{viscosity at 600 rpm})-(\text{viscosity at 300 rpm}) \quad \text{EQU. 2}$$

At shear stress less than the YP of the cement composition, the cement composition behaves as a rigid body, and at shear stress greater than the YP of the cement composition, the cement composition flows as a viscous fluid. In other words, the YP represents the amount of stress required to move a fluid from a static condition. The YP is determined by extrapolating the Bingham plastic rheology model to a shear rate of zero. The YP of the cement composition may be estimated from the PV from EQU. 2 by subtracting the PV from the shear stress measured at 300 rpm according to Equation 3 (EQU. 3), which is provided subsequently.

$$YP=(300\ \text{rpm reading})-PV \quad \text{EQU. 3}$$

The YP is expressed as a force per area, such as pounds of force per one hundred square feet ($lbf/100\ ft^2$) for example. The methods for measuring and determining PV and YP for the cement compositions are consistent with methods conventionally used for drilling fluids in general.

Fluid Loss Test

API fluid loss is a test that measures the static filtration behavior of the cement slurry at ambient temperature and 100-psi differential pressure. The fluid loss of the cement compositions may be measured according to test methods provided in the API Recommended Practice For Cementing (RP 10B).

Free Fluid API Test

Free fluid, which is also known as "free water," is the percent volume of fluid that separates from a cement slurry when the slurry is left static. The free fluid can be measured according to test methods provided in the API Recommended Practice For Cementing (RP 10B).

Thickening Time Test

Thickening time is a measurement of the time a cement slurry remains in a fluid state and is capable of being pumped. To assess thickening time, downhole conditions are simulated by plotting the consistency of the slurry over time at the anticipated temperature and pressure conditions. The consistency of the slurry is measured in Bearden Consistency units (Bc), which are a dimensionless quantity on a scale from 1 to 100. At levels greater than 50 Bc, pumping begins to become difficult, and at 100 Bc, the cement slurry is completely set.

EXAMPLES

The following examples illustrate one or more features of the present disclosure. It should be understood that these examples are not intended to limit the scope of the disclosure or the appended claims in any manner. In these Examples and Comparative Examples, Table 1 provides the composition for class G cement utilized as the cement precursor in the corrosion inhibiting cement compositions in these Examples and cement compositions of the Comparative Examples.

TABLE 1

Composition of Class G Cement

| Constituent | Mass % |
| --- | --- |
| Silica (SiO$_2$) | 21 |
| Alumina (Al$_2$O$_3$) | 3.5 |
| Iron Oxide (Fe$_2$O$_3$) | 3.9 |
| Calcium Oxide, Total (TCaO) | 62.3 |
| Magnesium Oxide (MgO) | 4.4 |
| Sulphur Trioxide (SO$_3$) | 2.8 |
| Loss on Ignition | 1 |
| Equivalent Alkali (as Na$_2$O) | 0.54 |

Comparative Example 1: Cement Composition without Amine Corrosion Inhibitor

In Comparative Example 1, a cement composition was prepared from the class G cement of Table 1 water and a defoamer. No amine corrosion inhibitor was included in the cement composition of Comparative Example 1. The formula for the cement composition of Comparative Example 1 is provided in Table 2. The cement composition of Comparative Example 1 was subjected to rheological testing according to the methods previously described in this disclosure, and the rheological properties are provided in Table 2.

Example 2: Corrosion Inhibiting Cement Composition with Monoethanolamine

For Example 2, a corrosion inhibiting cement composition comprising monoethanolamine (MEA) as the amine corrosion inhibitor was prepared. The rheological properties of the corrosion inhibiting cement composition of Example 2 were measured according to the test methods described in the present disclosure. The formulation and rheological properties for the corrosion inhibiting cement composition of Example 2 are provided in Table 2.

Example 3: Corrosion Inhibiting Cement Composition with Triethanolamine

For Example 3, a corrosion inhibiting cement composition comprising triethanolamine (TEA) as the amine corrosion inhibitor was prepared. The formulation for the corrosion inhibiting cement composition of Example 2 are provided in Table 2.

Examples 4 and 5: Corrosion Inhibiting Cement Composition with Polyethylene Polyamine For Examples 4 and 5, corrosion inhibiting cement composition comprising a blend of polyethylene polyamines as the amine corrosion inhibitor was prepared. The amine corrosion inhibitor of Examples 4 and 5 was Ethyleneamine E-100 available from Huntsman Corporation and included a blend of polyethylene polyamines having chemical formula (I) in which x is equal to 3, 4, 5, and greater than 5. The corrosion inhibiting cement composition of Example 4 was prepared with 7.2 grams of the amine corrosion inhibitor, and the corrosion inhibiting cement composition of Example 5 was prepared with 15 grams of the amine corrosion inhibitor. The formulations for the Examples 4 and 5 are provided in Table 2. The rheological properties of the corrosion inhibiting cement composition of Example 4 were measured according to the test methods described in the present disclosure and are reported in Table 2.

Thickening Time Test for Comparative Example 1 and Examples 2-5

The cement composition of Comparative Example 1 and the corrosion inhibiting cement compositions of Examples 2-5 were subjected to a thickening time test conducted in accordance with the test methods previously described in the present disclosure. For the corrosion inhibiting cement composition of Examples 2-5, the cement compositions were prepared and then combined with the amine corrosion inhibitor to produce the corrosion inhibiting cement composition just before conducting the thickening time test. The corrosion inhibiting cement compositions of Examples 2-5 were mixed for 5 minutes prior to the thickening time test.

The thickening time tests were conducted under conditions simulating downhole temperature and pressure conditions using a high temperature high pressure (HTHP) consistometer obtained from Chandler Engineering. Each cement composition or corrosion inhibiting cement composition was introduced to the HTHP consistometer, and the temperature and pressure of the cement composition or corrosion inhibiting cement composition was gradually increased over a period of 30 minutes. The temperature of the cement composition or corrosion inhibiting cement composition was increased to a temperature of 150 degrees Fahrenheit (° F.) (65.5° C.) to simulate a bottom hole circulating temperature (BHCT) of 65.5° C., and the pressure was ramped up to a final pressure of 1389 pounds per square inch (psi) (9577 kPa).

Figure 2:
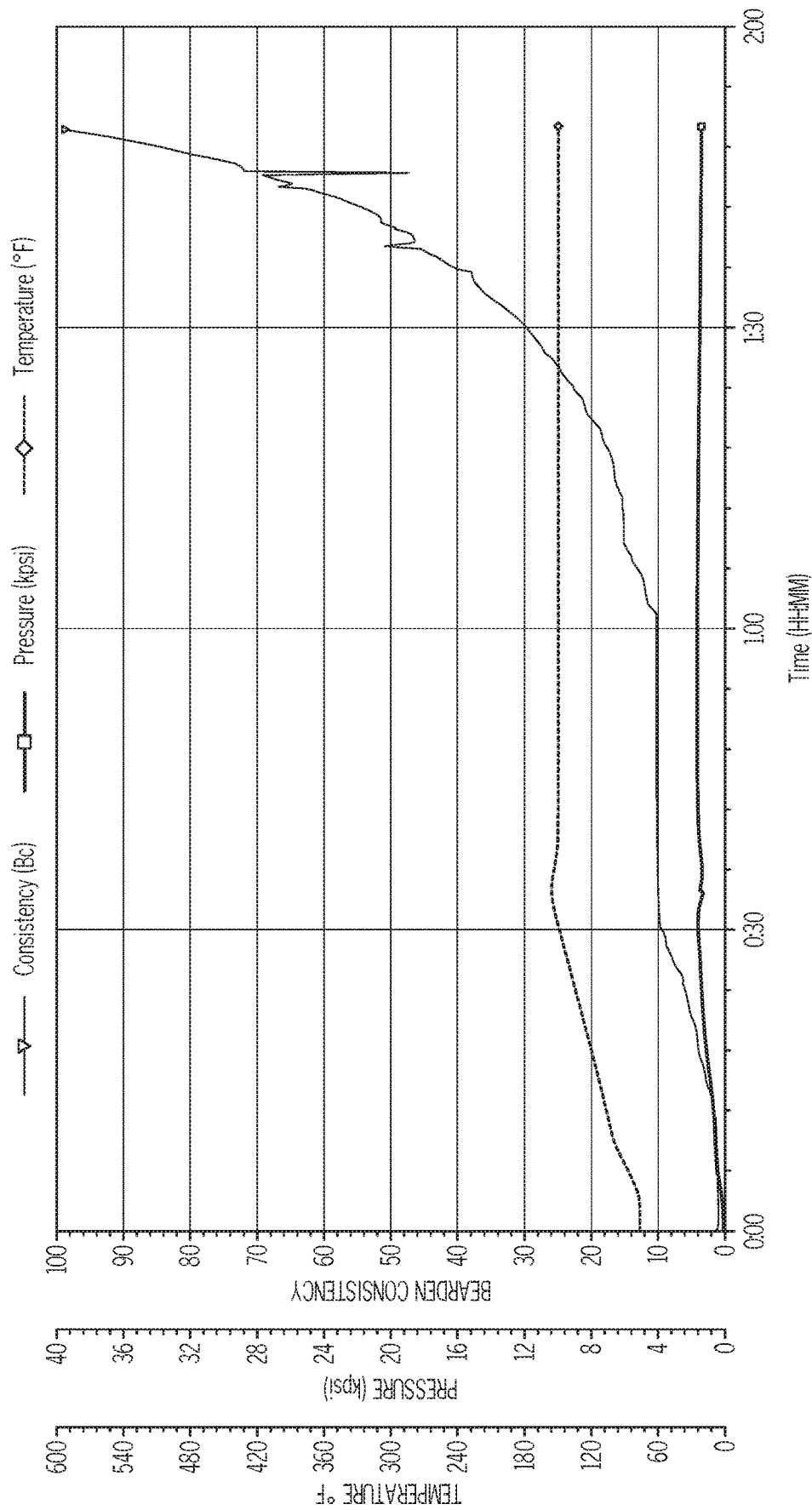
FIG. 2 graphically depicts the temperature, pressure, and Bearden consistency as a function of time for a cement composition of the prior art without an amine corrosion inhibitor.
Figure 3:
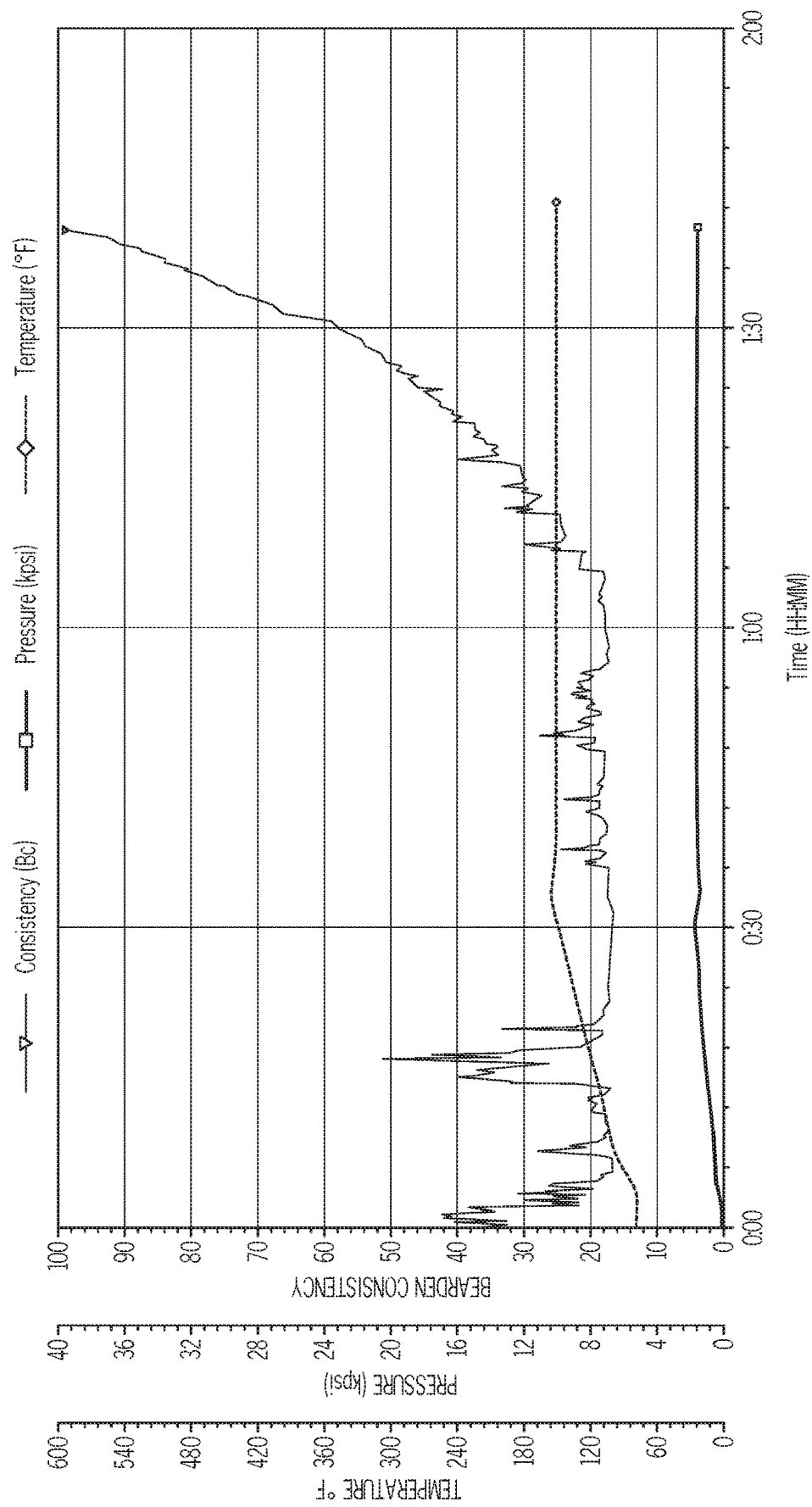
FIG. 3 graphically depicts the temperature, pressure, and Bearden consistency as a function of time for a corrosion inhibiting cement composition, according to one or more embodiments shown and described in the present disclosure.
Figure 4:
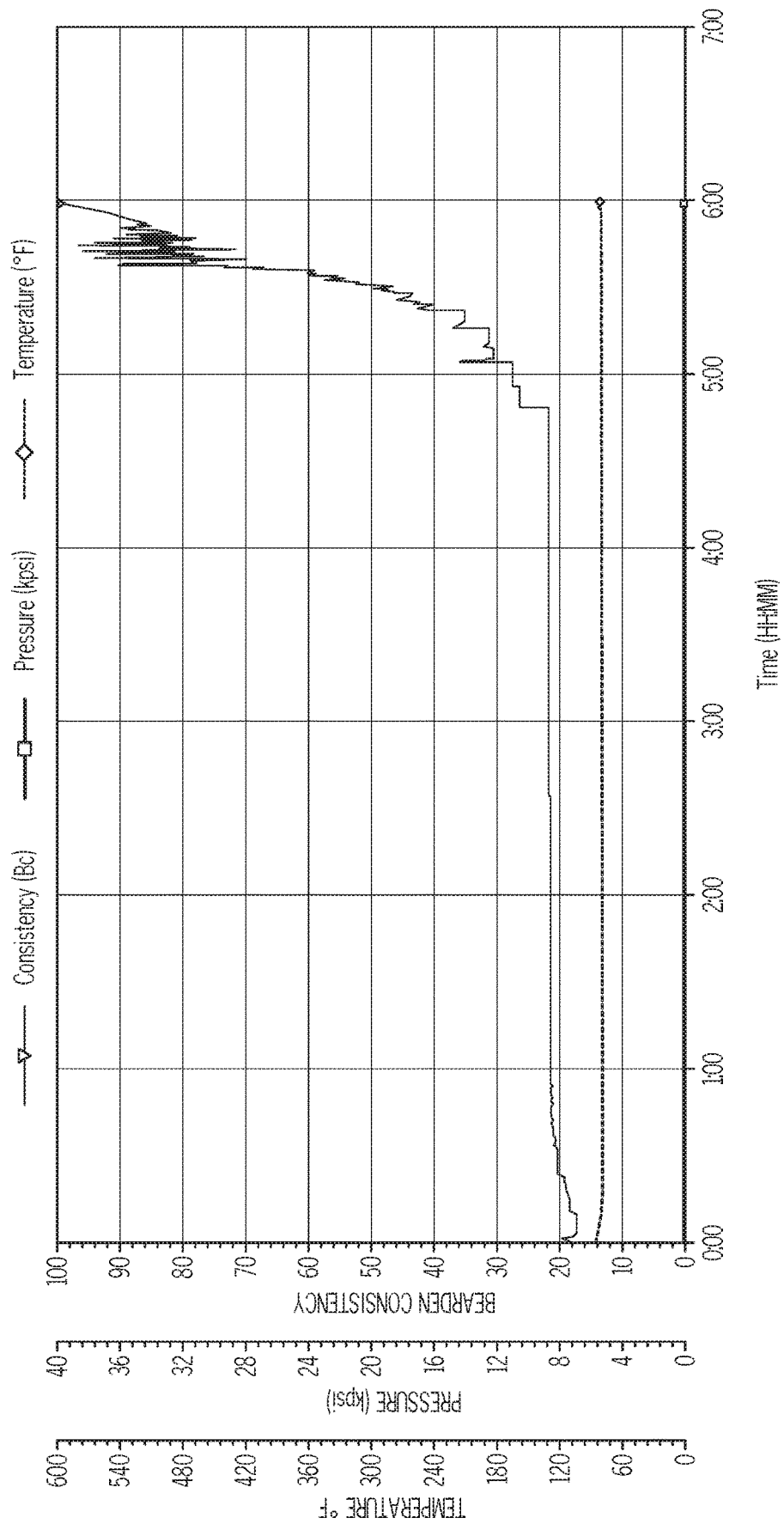
FIG. 4 graphically depicts the temperature, pressure, and Bearden consistency as a function of time for another corrosion inhibiting cement composition, according to one or more embodiments shown and described in the present disclosure.
Figure 5:
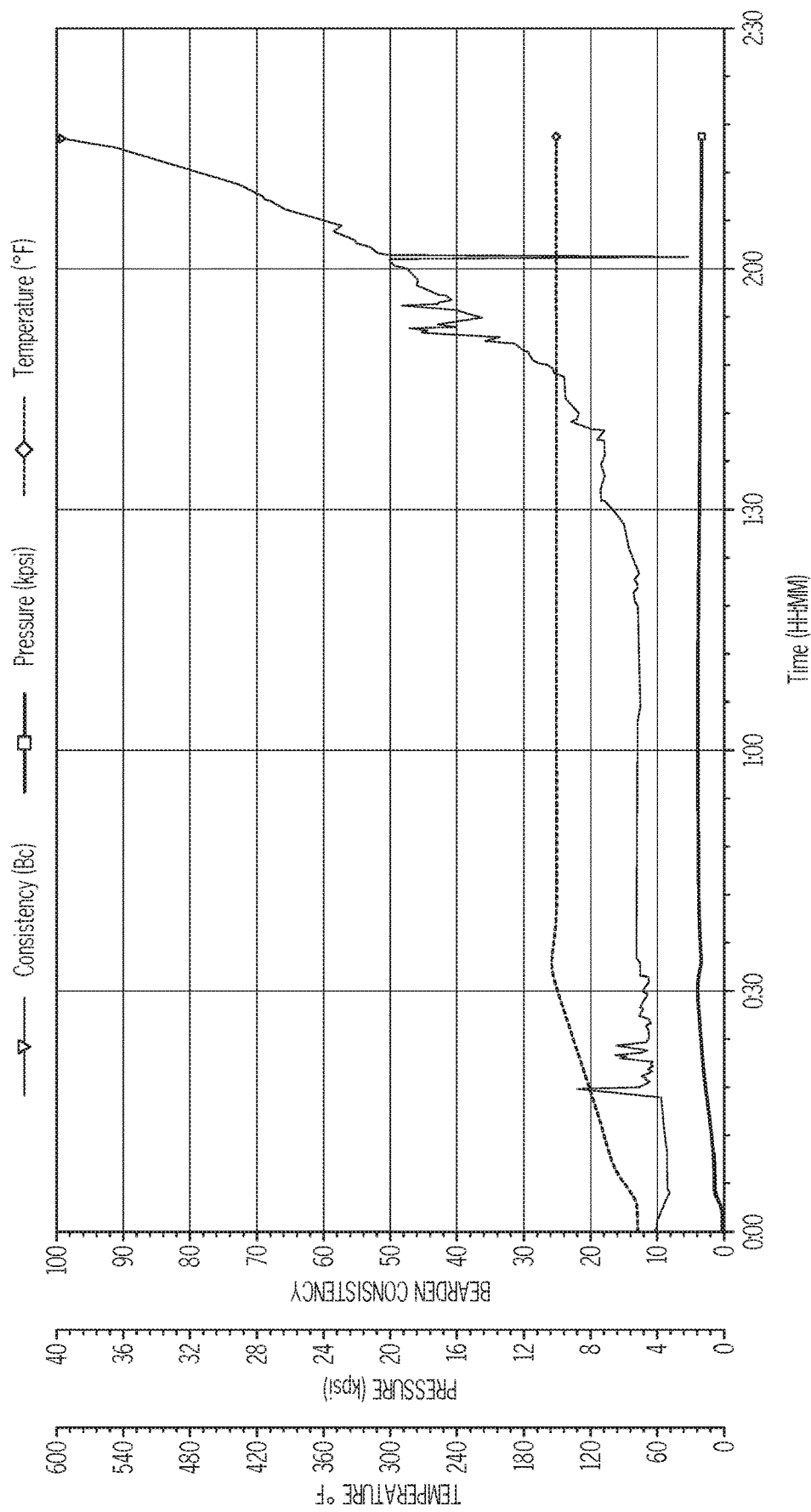
FIG. 5 graphically depicts the temperature, pressure, and Bearden consistency as a function of time for still another corrosion inhibiting cement composition, according to one or more embodiments shown and described in the present disclosure.
Figure 6:
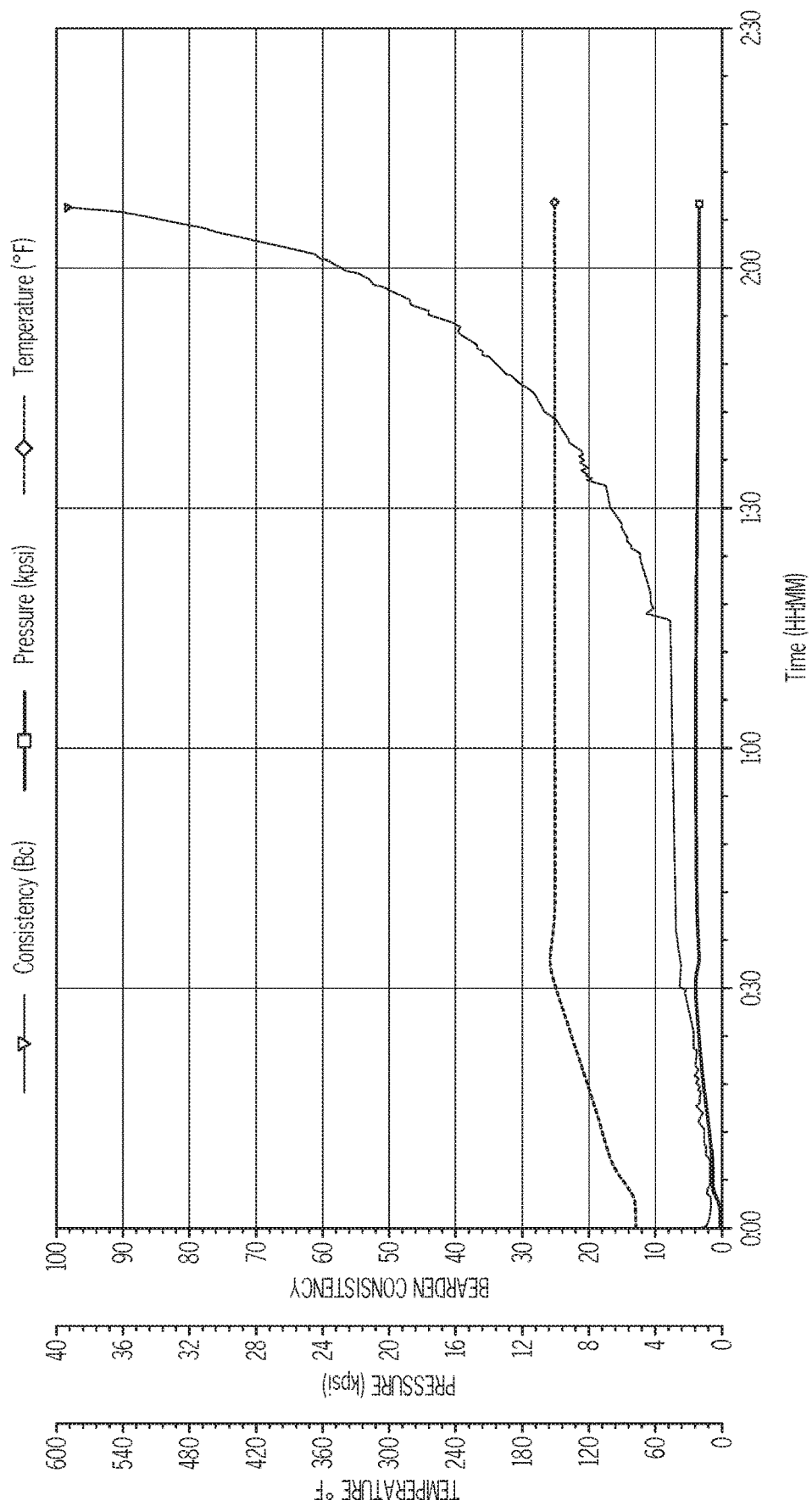
FIG. 6 graphically depicts the temperature, pressure, and Bearden consistency as a function of time for still another corrosion inhibiting cement composition, according to one or more embodiments shown and described in the present disclosure.

FIG. 2 shows the temperature, pressure, and Bearden consistency (y-axis) as a function of time (x-axis) during the thickening time test for Comparative Example 1. FIGS. 3-6 show the temperature, pressure, and Bearden consistency (y-axis) as a function of time (x-axis) during the thickening time test for Examples 2 through 5, respectively. The thickening time test results of Examples 2 through 5 demonstrate that including the polyethylene polyamines as the amine corrosion inhibitor in the cement composition of the present disclosure do not affect the thickening time of the cement compositions. Thus, the amine corrosion inhibitors, such as polyethylene polyamines, can be added to the corrosion inhibiting cement compositions of the present disclosure to reduce corrosion caused by brines or H$_2$S in the formation without effecting the ability to pump the corrosion inhibiting cement composition.

The thickening time and Final Bearden consistency for the cement composition of Comparative Example 1 and each of the corrosion inhibiting cement compositions of Examples 2-5 were measured using the HTHP consistometer and the results are provided in Table 2.

TABLE 2

|  | Comparative Example 1 | Example 2 | Example 3 | Example 4 | Example 5 |
|---|---|---|---|---|---|
| Amine Corrosion Inhibitor (ACI) | N/A | MEA | TEA | E-100 | E-100 |
| ACI (grams (g)) | N/A | 7.6 | 2.4 | 7.22 | 15 |
| Cement Precursor (g) | 800 | 800 | 800 | 800 | 800 |
| Water (g) | 355 | 355 | 360 | 355 | 355 |
| Defoamer (g) | 1 | 1 | 0 | 1 | 1 |
| Total Weight (g) | 1156 | 1163.6 | 1162.4 | 1163.22 | 1171.0 |
| Rheological Data at 120° | | | | | |
| Reading at 600 rpm | 142 | 108 | — | 155 | — |
| Reading at 300 rpm | 119 | 87 | — | 115 | — |
| Reading at 200 rpm | 86 | 75 | — | 98 | — |
| Reading at 100 rpm | 70 | 63 | — | 76 | — |
| Reading at 6 rpm | 16 | 20 | — | 22 | — |
| Reading at 3 rpm | 10 | 12 | — | 18 | — |
| PV (cP) | 23 | 21 | — | 40 | — |
| YP (lbf/100 ft$^2$) | 96 | 66 | — | 75 | — |
| 10-sec gel strength (lbf/100 ft$^2$) | 17 | 15 | — | 19 | — |
| 10-min gel strength (lbf/100 ft$^2$) | 16 | 21 | — | 50 | — |
| Thickening Time Test | | | | | |
| FIG. | 2 | 3 | 4 | 5 | 6 |
| Thickening Time (hours:minutes) | 1:50 | 1:40 | 5:59 | 2:16 | 2:08 |
| BC Final | 100 | 100 | 100 | 100 | 100 |

As shown by Example 2, including MEA as the amine corrosion inhibitor in the corrosion inhibiting cement compositions can reduce the thickening time of the corrosion inhibiting cement composition compared to the cement composition of Comparative Example 1 without the amine corrosion inhibitor. However, incorporating MEA as the amine corrosion inhibitor may have an impact on the rheological properties of the corrosion inhibiting cement composition. In particular, the MEA in Example 2 was observed to reduce the viscosity, PV, YP, and 10-second gel strength of the corrosion inhibiting cement composition of Example 2 compared to the cement composition of Comparative Example 1.

As shown by Example 4, incorporating the polyethylene polyamines as the amine corrosion inhibitor in the corrosion inhibiting cement compositions may provide improved rheological properties compared to the cement composition of Comparative Example 1 without the amine corrosion inhibitor while also providing a thickening time comparable to the cement composition of Comparative Example 1. In particular, the corrosion inhibiting cement composition of Example 4 exhibited greater viscosity, PV, 10-second gel strength, and 10-minute gel strength compared to the cement composition of Comparative Example 1 and the corrosion inhibiting cement composition of Example 2. The thickening time for the corrosion inhibiting cement composition of Example 4 was only 26 minutes greater than the thickening time for the cement composition of Comparative Example 1. Thus, the data in Table 3 shows that incorporating the polyethylene polyamines as the amine corrosion inhibitor in the corrosion inhibiting cement compositions of the present disclosure can provide the corrosion inhibiting effects of the amine compounds without having an adverse effect on the thickening time or the rheological properties of the corrosion inhibiting cement composition.

The final Bearden consistency for comparative example 1 and Examples 2-5 were all 100 at the end of the thickening time. Example 3 only included 2.4 grams of TEA as the amine corrosion inhibitor and exhibited a thickening time of 5 hours and 59 minutes. Example 3 shows that too little amine corrosion inhibitor may have the effect of increasing the thickening time. Thus, a lesser amount of the amine corrosion inhibitor may have a retarding effect on the cure rate of the corrosion inhibiting cement composition. For Examples 2, 4, and 5, the amount of amine corrosion inhibitor was increased to greater than 7 grams in the formulations. This amount of amine corrosion inhibitor reduced the thickening time back down to thickening times comparable to the cement composition of Comparative Example 1 without the amine corrosion inhibitor. By comparing Examples 4 and 5, it is shown that further increasing the amount of polyethylene polyamine corrosion inhibitors can further reduce the thickening time of the corrosion inhibiting cement compositions.

Comparative Example 6

In Comparative Example 6, a cement composition for sealing an annulus of a wellbore was prepared. The cement composition of Comparative Example 6 did not include an amine corrosion inhibitor. The cement composition included Saudi Class G cement as the cement precursor and drill water as the water component. The cement composition further included course silica flour and 100 mesh silica flour as strength stabilizing agents and hematite and hausmannite as weighting agents. The cement composition of Comparative Example 6 further included an expansion additive (MICROBOND HT™ expansion additive—Halliburton), a defoamer (D-AIR 3000L™ defoamer—Halliburton), a latex (LATEX 2000™ cement additive—Halliburton), a latex stabilizer (STABILIZER 434B™ latex stabilizer—Halliburton), and cement retarders. The cement retarders included HR® 12 and HR® 25 cement retarders from Halliburton. The formulation and rheological properties for the cement composition of Comparative Example 6 are provided in Table 3.

Example 7

In Example 7, a corrosion inhibiting cement composition for sealing an annulus of a wellbore was prepared. The corrosion inhibiting cement composition of Example 7 included the Saudi Class G cement as the cement precursor and drill water as the water. The corrosion inhibiting cement composition included the silica flours, weighting agents, expansion additive, defoamer, latex, latex stabilizer, and cement retarders described in Comparative Example 6. The corrosion inhibiting cement composition of Example 7 further included a blend of polyethylene polyamines as the amine corrosion inhibitor. The polyethylene polyamine blend was the same as described in Examples 4 and 5. The formulation and rheological properties for the corrosion inhibiting cement composition of Example 7 are provided in Table 3.

TABLE 3

|  | Units | Comparative Example 6 | Example 7 |
|---|---|---|---|
| Saudi Class G cement | g | 600.00 | 600.00 |
| Drill Water | g | 233.33 | 233.33 |
| Silica Flour | g | 72.00 | 72.00 |
| 100 mesh Silica Flour | g | 168.00 | 168.00 |
| Hematite | g | 450.00 | 450.00 |
| Hausmannite | g | 450.00 | 450.00 |
| Expansion Additive | g | 18.00 | 18.00 |

TABLE 3-continued

|  | Units | Comparative Example 6 | Example 7 |
| --- | --- | --- | --- |
| Defoamer | g | 1.00 | 1.00 |
| Latex Stabilizer | g | 8.45 | 8.45 |
| Latex | g | 53.15 | 53.15 |
| Cement Retarder 1 | g | 14.40 | 14.40 |
| Cement Retarder 2 | g | 1.20 | 1.20 |
| Amine Corrosion Inhibitor | g | — | 5.42 |
| Total | g | 2069.53 | 2074.95 |
| Rheological Properties | | | |
| Reading at 600 rpm | — | Out of Range | Out of Range |
| Reading at 300 rpm | — | 245 | 270 |
| Reading at 200 rpm | — | 169 | 192 |
| Reading at 100 rpm | — | 101 | 112 |
| Reading at 6 rpm | — | 36 | 43 |
| Reading at 3 rpm | — | 28 | 31 |

The rheological data in Table 3 shows that the rheological measurements for the corrosion inhibiting cement composition of Example 7 are comparable to the cement composition of Comparative Example 6 without the amine corrosion inhibitor. Thus, the amine corrosion inhibitors can be added to a cement composition to produce the corrosion inhibiting cement compositions of the present disclosure without negatively effecting the rheological properties of the cement.

A first aspect of the present disclosure may be directed to methods for reducing corrosion in tubular strings installed in wellbores. The methods may include dispensing a corrosion inhibiting cement composition into an annulus defined between a tubular string and an inner wall of a wellbore or between two tubular strings. The corrosion inhibiting cement composition may comprise a polyethylene polyamine and a cement composition comprising a cement precursor and water. The methods may further include allowing the corrosion inhibiting cement composition to cure in the annulus to form a cured cement. The polyethylene polyamines in the corrosion inhibiting cement composition may react with a metal of the tubular string, the reaction forming a protective layer on the surfaces of the tubular string, where the protective layer may reduce or prevent dissolution of iron from the metal of the tubular string.

A second aspect of the present disclosure may include the first aspect, further comprising drilling a portion of a wellbore and placing a tubular string in the wellbore.

A third aspect of the present disclosure may include either one of the first or second aspects, further comprising preparing the corrosion inhibiting cement composition.

A fourth aspect of the present disclosure may include any one of the first through third aspects, where preparing the corrosion inhibiting cement composition may comprise preparing the cement composition, combining the polyethylene polyamine and the cement composition to produce the corrosion inhibiting cement composition, and mixing the corrosion inhibiting cement composition to obtain a homogeneous mixture.

A fifth aspect of the present disclosure may include any one of the first through fourth aspects, where dispensing the corrosion inhibiting cement composition into the annulus may comprise pumping the corrosion inhibiting cement composition into the wellbore and displacing the corrosion inhibiting cement composition up into the annulus.

A sixth aspect of the present disclosure may include the fifth aspect, where displacing the corrosion inhibiting cement composition up into the annulus may comprise pumping a displacement fluid into the wellbore after the corrosion inhibiting cement composition, where the displacement fluid may cause the corrosion inhibiting cement composition in the wellbore to flow up into the annulus.

A seventh aspect of the present disclosure may include any one of the first through sixth aspects, where the at least one polyethylene polyamine may comprise tetraethylenepentamine (TEPA), pentaethylenehexamine (PEHA), and hexaethyleneheptamine (HEHA).

An eighth aspect of the present disclosure may include any one of the first through sixth aspects, where the at least one polyethylene polyamine may comprise hexaethyleneheptamine, a mixture of polyethylene polyamines having molecular weights greater than a molecular weight of hexaethyleneheptamine, or both.

A ninth aspect of the present disclosure may include any one of the first through eighth aspects, where the corrosion inhibiting cement composition may comprise from 0.1% BWOC to 60% BWOC polyethylene polyamine.

A tenth aspect of the present disclosure may include any one of the first through ninth aspects, where the cement precursor may comprise American Petroleum Institute (API) Class G cement.

An eleventh aspect of the present disclosure may include any one of the first through tenth aspects, where the cement composition may comprise from 10 wt. % to 70 wt. % API Class G cement based on the total weight of the cement composition and from 5 wt. % to 70 wt. % water based on the total weight of the cement composition.

A twelfth aspect of the present disclosure may include any one of the first through eleventh aspects, where the cement composition may comprise from 5% BWOC to 50% BWOC silica flour.

A thirteenth aspect of the present disclosure may include the twelfth aspect, where the silica flour may comprise a 200 mesh silica flour and a 100 mesh silica flour.

A fourteenth aspect of the present disclosure may include any one of the first through thirteenth aspects, where the cement composition may comprise from 10% BWOC to 150% BWOC weighting agent.

A fifteenth aspect of the present disclosure may include the fourteenth aspect, where the weighting agent may comprise hematite, hausmanite, or both.

A sixteenth aspect of the present disclosure may include any one of the first through fifteenth aspects, where the cement composition may comprise from greater than 0% BWOC to less than or equal to 10% BWOC expansion additive.

A seventeenth aspect of the present disclosure may include any one of the first through sixteenth aspects, where the cement composition may comprise from greater than 0 percent BWOC to less than or equal to 5 percent BWOC defoamer.

An eighteenth aspect of the present disclosure may include any one of the first through seventeenth aspects, where the cement composition may comprise from greater than 0 percent BWOC to less than or equal to 10 percent BWOC latex.

A nineteenth aspect of the present disclosure may include the eighteenth aspect, where the cement composition may comprise from greater than 0 percent BWOC to less than or equal to 10 percent BWOC latex stabilizer.

A twentieth aspect of the present disclosure may include any one of the first through nineteenth aspects, where the cement composition may comprise from greater than 0 percent BWOC to less than or equal to 10 percent BWOC cement retarder.

A twenty-first aspect of the present disclosure may include any one of the first through twentieth aspects, where the corrosion inhibiting cement composition may comprise a cement composition comprising from 10 wt. % to 70 wt. % Class G cement based on the total weight of the cement composition, from 5 wt. % to 70 wt. % water based on the total weight of the cement composition, from 5% BWOC to 50% BWOC silica flour, from 10% BWOC to 150% BWOC weighting agent, and from greater than 0% BWOC to less than or equal to 10% BWOC cement retarder. The corrosion inhibiting cement composition may further comprise from 0.1% BWOC to 60% BWOC polyethylene polyamine, where the polyethylene polyamine may comprise TEPA, PEHA, HEHA, and one or more polyethylene polyamines having molecular weights greater than a molecular weight of HEHA.

A twenty-second aspect of the present disclosure may include the twenty-first aspect, in which the cement composition may further comprise from greater than 0 percent BWOC to less than or equal to 10 percent BWOC expansion additive, from greater than 0 percent BWOC to less than or equal to 5 percent BWOC defoamer, from greater than 0 percent BWOC to less than or equal to 10 percent BWOC latex, and from greater than 0 percent BWOC to less than or equal to 10 percent BWOC latex stabilizer.

A twenty-third aspect of the present disclosure may be directed to a corrosion inhibiting cement composition for reducing corrosion of wellbore casings. The corrosion inhibiting cement composition may comprise from 10 weight percent to 70 weight percent cement precursor based on the total weight of the cement composition, from 5 weight percent to 70 weight percent water based on the total weight of the cement composition, and from 0.1 percent BWOC to 60 percent BWOC polyethylene polyamine, where the polyethylene polyamine comprises at least one of TEPA, PEHA, HEHA, one or more polyethylene polyamines having molecular weights greater than a molecular weight of HEHA, or combinations of these.

A twenty-fourth aspect of the present disclosure may include the twenty-third aspect, where the polyethylene polyamine may comprise HEHA, one or more polyethylene polyamines having molecular weights greater than a molecular weight of HEHA, or both.

A twenty-fifth aspect of the present disclosure may include the twenty-third aspect, where the polyethylene polyamine may comprise TEPA, PEHA, HEHA, and one or more polyethylene polyamines having molecular weights greater than a molecular weight of HEHA.

A twenty-sixth aspect of the present disclosure may include any one of the twenty-third through twenty-fifth aspects, further comprising from 5 percent BWOC to 50 percent BWOC silica flour.

A twenty-seventh aspect of the present disclosure may include any one of the twenty-third through twenty-sixth aspects, further comprising from 10 percent BWOC to 150 percent BWOC weighting agent.

A twenty-eighth aspect of the present disclosure may include any one of the twenty-third through twenty-seventh aspects, further comprising from greater than 0 percent BWOC to less than or equal to 10 percent BWOC cement retarder.

A twenty-ninth aspect of the present disclosure may include any one of the twenty-third through twenty-eighth aspects, where the cement precursor is API Class G cement.

A thirtieth aspect of the present disclosure may include any one of the twenty-third through twenty-ninth aspects, further comprising from greater than 0 percent BWOC to less than or equal to 10 percent BWOC expansion additive.

A thirty-first aspect of the present disclosure may include any one of the twenty-third through thirtieth aspects, further comprising from greater than 0 percent BWOC to less than or equal to 5 percent BWOC defoamer.

A thirty-second aspect of the present disclosure may include any one of the twenty-third through thirty-first aspects, further comprising from greater than 0 percent BWOC to less than or equal to 10 percent BWOC latex.

A thirty-third aspect of the present disclosure may include the thirty-second aspect, further comprising from greater than 0 percent BWOC to less than or equal to 10 percent BWOC latex stabilizer.

A thirty-fourth aspect of the present disclosure may include any one of the twenty-third through twenty-ninth aspects, further comprising from greater than 0 percent BWOC to less than or equal to 10 percent BWOC expansion additive, from greater than 0 percent BWOC to less than or equal to 5 percent BWOC defoamer, from greater than 0 percent BWOC to less than or equal to 10 percent BWOC latex, and from greater than 0 percent BWOC to less than or equal to 10 percent BWOC latex stabilizer.

A thirty-fifth aspect of the present disclosure may include any one of the first through thirty-fourth aspects, where the gel strength of the corrosion inhibiting cement composition may have a value greater than or equal to 1 when measured at room temperature and at a speed of 3 rotations per minute (rpm) using the method provided in the API Recommended Practice For Cementing (RP 10B).

A thirty-sixth aspect of the present disclosure may include any one of the first through thirty-fifth aspects, where the corrosion inhibiting cement composition may have a gel strength greater than or equal to 1 using the method provided in the API Recommended Practice for Cementing.

A thirty-seventh aspect of the present disclosure may include any one of the first through thirty-sixth aspects, where the corrosion inhibiting cement composition may have a density in a range of from 65 pcf to 180 pcf.

A thirty-eighth aspect of the present disclosure may include any one of the first through thirty-seventh aspects, where the corrosion inhibiting cement composition may have a cure time of from 0.5 hours to 12 hours.

A thirty-ninth aspect of the present disclosure may include any one of the first through thirty-eighth aspects, where the corrosion inhibiting cement composition may have a cure time of from 0.5 hours to 4 hours or from 0.5 hours to 3 hours.

A fortieth aspect of the present disclosure may include any one of the first through thirty-ninth aspects, where the corrosion inhibiting cement composition has a thickening time of from 0.5 hours to 12 hours, from 0.5 hours to 4 hours, or from 0.5 hours to 3 hours.

It is noted that one or more of the following claims utilize the term "where" or "in which" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising." For the purposes of defining the present technology, the transitional phrase "consisting of" may be introduced in the claims as a closed preamble term limiting the scope of the claims to the recited components or steps and any naturally occurring impurities.

For the purposes of defining the present technology, the transitional phrase "consisting essentially of" may be introduced in the claims to limit the scope of one or more claims to the recited elements, components, materials, or method steps as well as any non-recited elements, components, materials, or method steps that do not materially affect the novel characteristics of the claimed subject matter. The transitional phrases "consisting of" and "consisting essentially of" may be interpreted to be subsets of the open-ended transitional phrases, such as "comprising" and "including," such that any use of an open ended phrase to introduce a recitation of a series of elements, components, materials, or steps should be interpreted to also disclose recitation of the series of elements, components, materials, or steps using the closed terms "consisting of" and "consisting essentially of." For example, the recitation of a composition "comprising" components A, B, and C should be interpreted as also disclosing a composition "consisting of" components A, B, and C as well as a composition "consisting essentially of" components A, B, and C. Any quantitative value expressed in the present application may be considered to include open-ended embodiments consistent with the transitional phrases "comprising" or "including" as well as closed or partially closed embodiments consistent with the transitional phrases "consisting of" and "consisting essentially of."

As used in the Specification and appended Claims, the singular forms "a", "an", and "the" include plural references unless the context clearly indicates otherwise. The verb "comprises" and its conjugated forms should be interpreted as referring to elements, components or steps in a non-exclusive manner. The referenced elements, components or steps may be present, utilized or combined with other elements, components or steps not expressly referenced.

It should be understood that any two quantitative values assigned to a property may constitute a range of that property, and all combinations of ranges formed from all stated quantitative values of a given property are contemplated in this disclosure. The subject matter of the present disclosure has been described in detail and by reference to specific embodiments. It should be understood that any detailed description of a component or feature of an embodiment does not necessarily imply that the component or feature is essential to the particular embodiment or to any other embodiment. Further, it should be apparent to those skilled in the art that various modifications and variations can be made to the described embodiments without departing from the spirit and scope of the claimed subject matter.

What is claimed is:

1. A corrosion inhibiting cement composition for reducing corrosion of wellbore casings, the corrosion inhibiting cement composition comprising:
   30 wt.% cement precursor based on the total weight of the corrosion inhibiting cement composition, where the cement precursor is API Class G cement;
   40 percent by weight of cement (BWOC) silica flour;
   150 percent BWOC of the weighting agent;
   3 percent BWOC expansion additive;
   0.2 percent BWOC defoamer;
   9 percent BWOC latex;
   1.4 percent BWOC latex stabilizer;
   2.6 percent BWOC cement retarder; and
   0.9 percent BWOC amine corrosion inhibitor, where the amine corrosion inhibitor comprises a polyethylene polyamine, where the polyethylene polyamine comprises hexaethyleneheptamine (HEHA), one or more polyethylene polyamines having molecular weights greater than a molecular weight of hexaethyleneheptamine, or both; and
   the balance water, where the corrosion inhibiting cement composition comprises from 5 weight percent to 70 weight percent water based on the total weight of the cement composition;
   where the corrosion inhibiting cement composition has a thickening time of from 0.5 hours to 6 hours.

2. The corrosion inhibiting cement composition of claim 1, in which the polyethylene polyamine further comprises tetraethylenepentamine (TEPA), pentaethylenehexamine (PEHA), or both.

3. The corrosion inhibiting cement composition of claim 1, in which the polyethylene polyamine comprises tetraethylenepentamine (TEPA), pentaethylenehexa mine (PEHA), hexaethyleneheptamine (HEHA), and one or more polyethylene polyamines having molecular weights greater than a molecular weight of hexaethyleneheptamine.

4. A method for reducing corrosion in tubular strings installed in wellbores, the method comprising:
   dispensing the corrosion inhibiting cement composition of claim 1 into an annulus defined between a tubular string and an inner wall of a wellbore or between two tubular strings; and
   allowing the corrosion inhibiting cement composition to cure in the annulus to form a cured cement, where the polyethylene polyamines in the corrosion inhibiting cement composition react with a metal of the tubular string, the reaction forming a protective layer on the surfaces of the tubular string, the protective layer preventing dissolution of iron from the metal of the tubular string.

5. The method of claim 4, further comprising drilling a portion of a wellbore and placing a tubular string in the wellbore.

6. The method of claim 4, further comprising preparing the corrosion inhibiting cement composition, where preparing the corrosion inhibiting cement composition comprises:
   preparing the cement composition;
   combining the polyethylene polyamine and the cement composition to produce the corrosion inhibiting cement composition; and
   mixing the corrosion inhibiting cement composition to obtain a homogeneous mixture.

7. The method of claim 4, where dispensing the corrosion inhibiting cement composition into the annulus comprises pumping the corrosion inhibiting cement composition into the wellbore and displacing the corrosion inhibiting cement composition up into the annulus.

8. The method of claim 7, where displacing the corrosion inhibiting cement composition up into the annulus comprises pumping a displacement fluid into the wellbore after the corrosion inhibiting cement composition, where the displacement fluid causes the corrosion inhibiting cement composition in the wellbore to flow up into the annulus.

* * * * *